United States Patent
Xu et al.

(10) Patent No.: US 12,004,209 B2
(45) Date of Patent: Jun. 4, 2024

(54) REMOTE INTERFERENCE MITIGATION RESOURCE CONFIGURATION

(71) Applicant: ZTE Corporation, Guangdong (CN)

(72) Inventors: Hanqing Xu, Guangdong (CN); Jun Xu, Guangdong (CN); Mengzhu Chen, Guangdong (CN); Yajun Zhao, Guangdong (CN); Saijin Xie, Guangdong (CN)

(73) Assignee: ZTE Corporation, Shenzhen (CN)

( * ) Notice: Subject to any disclaimer, the term of this patent is extended or adjusted under 35 U.S.C. 154(b) by 519 days.

(21) Appl. No.: 17/232,044

(22) Filed: Apr. 15, 2021

(65) Prior Publication Data

US 2021/0235463 A1    Jul. 29, 2021

Related U.S. Application Data

(63) Continuation of application No. PCT/CN2019/071448, filed on Jan. 11, 2019.

(51) Int. Cl.
*H04W 72/541* (2023.01)
*H04L 5/00* (2006.01)

(52) U.S. Cl.
CPC ......... *H04W 72/541* (2023.01); *H04L 5/0048* (2013.01)

(58) Field of Classification Search
None
See application file for complete search history.

(56) References Cited

U.S. PATENT DOCUMENTS

| | | |
|---|---|---|
| 6,304,760 B1 | 10/2001 | Thomson et al. |
| 2010/0120367 A1 | 5/2010 | Nanda et al. |
| 2011/0134867 A1* | 6/2011 | Lee .................. H04B 7/0691 370/328 |
| 2013/0322289 A1 | 12/2013 | Zhu et al. |
| 2014/0056190 A1 | 2/2014 | Qian et al. |
| 2014/0120967 A1 | 5/2014 | Purnadi et al. |
| 2015/0131631 A1 | 5/2015 | Chen |
| 2016/0338050 A1 | 11/2016 | Kim et al. |

(Continued)

FOREIGN PATENT DOCUMENTS

| | | |
|---|---|---|
| CN | 102356659 A | 2/2012 |
| CN | 103210598 A | 7/2013 |

(Continued)

OTHER PUBLICATIONS

USPTO, Notice of Allowance for U.S. Appl. No. 17/185,506 mailed on Apr. 26, 2023, 16 pages.

(Continued)

*Primary Examiner* — Mariela Vidal Carpio
(74) *Attorney, Agent, or Firm* — Perkins Coie LLP

(57) ABSTRACT

Techniques are described for configuring resources for remote interference mitigation (RIM). An example method includes configuring a first sequence for a reference signal (RS) in response to determining that the RS includes information indicative of a first type of status information. The method also includes configuring a second sequence for the RS in response to determining that the RS includes information indicative of a second type of status information, where the RS is transmitted in response to determining an interference and based on the configured first sequence or second sequence.

15 Claims, 12 Drawing Sheets

(56) References Cited

U.S. PATENT DOCUMENTS

| | | | |
|---|---|---|---|
| 2018/0076917 | A1 | 3/2018 | Pan et al. |
| 2018/0124636 | A1 | 5/2018 | Ly et al. |
| 2019/0207798 | A1 | 7/2019 | Wang et al. |
| 2020/0044764 | A1 | 2/2020 | Xu et al. |
| 2020/0374874 | A1 | 11/2020 | Ke et al. |
| 2021/0274511 | A1 | 9/2021 | Cao et al. |
| 2021/0307020 | A1 | 9/2021 | Baldemair et al. |
| 2021/0321268 | A1 | 10/2021 | Ly et al. |
| 2021/0352509 | A1 | 11/2021 | Sundberg et al. |
| 2021/0352554 | A1 | 11/2021 | Barac et al. |
| 2021/0368510 | A1 | 11/2021 | Xia et al. |
| 2021/0385048 | A1* | 12/2021 | Ren ............... H04L 5/0073 |
| 2021/0385795 | A1* | 12/2021 | Cao ............... H04W 72/0466 |
| 2021/0400676 | A1* | 12/2021 | Faxér ............. H04L 25/0226 |
| 2021/0410081 | A1* | 12/2021 | Xu ................ H04W 72/54 |
| 2022/0006552 | A1* | 1/2022 | Ghozlan ......... H04J 11/0056 |
| 2022/0052832 | A1* | 2/2022 | Ersbo ............. H04L 5/0062 |
| 2022/0116247 | A1* | 4/2022 | Sengupta ........ H04L 5/0094 |
| 2023/0143073 | A1* | 5/2023 | Li ................. H04W 74/0866 370/329 |

FOREIGN PATENT DOCUMENTS

| | | |
|---|---|---|
| CN | 104956716 A | 9/2015 |
| CN | 108259112 A | 7/2018 |
| WO | 2009046330 A1 | 4/2009 |
| WO | 2016192590 A1 | 12/2016 |
| WO | 2020067989 A1 | 4/2020 |

OTHER PUBLICATIONS

EPO, Communication pursuant to Article 94(3) EPC for European Application No. 18930067.6 mailed on Mar. 13, 2023, 4 pages.

KIPO, Notice of Final Rejection for Korean Application No. 10-2021-7016213, mailed on Apr. 12, 2023, 5 pages with unofficial English summary.

European Search Report for EP Patent Application No. 19849276.1, dated Jan. 5, 2022, 8 pages.

ZTE, "Discussion on RIM mechanisms for improving network robustness," 3GPP TSG RAN WG1 Meeting #95, R1-1812440, Spokane, USA, Nov. 12-16, 2018, 13 pages.

ZTE, "Discussion on reference signal for RIM," 3GPP TSG RAN WG1 Meeting #95, R1-1812441, Spokane, USA, Nov. 12-16, 2018, 9 pages.

3rd Generation Partnership Project; Technical Specification Group Radio Access Network; Study on remote Interference management for NR (Release 16), 3GPP TR 38.866, V16.0.0, (Dec. 2018), 11 pages.

CATT, "On identification of aggressor and victim gNBs," 3GPP TSG RAN WG1 #95, R1-1812627, Spokane, USA, Nov. 12-16, 2018, 6 pages.

CMCC, "Updated summary for NR RIM," 3GPP TSG RAN WG1 Meeting #94bis, R1-1811981, Chengdu, China, Oct. 8-12, 2018, 35 pages.

CMCC, "Discussion on RS design for RIM," 3GPP TSG RAN WG1 Meeting #94, Gothenburg, Sweden, Aug. 20-24, 2018, R1-1808842, 12 pages.

Ericsson "On encoding of gNB set ID in RIM-RS" 3GPP TSG-RAN WG1 Meeting #94bis Chengdu, China, Oct. 8-12, 2018, Tdoc R1-1811439, 6 pages.

Tisense, "Discussion on procedure for RIM framework" 3GPP TSG RAN WG1 Meeting #94bis ChengDu, China, Oct. 8-12, 2018, R1-1811419, 4 pages.

Qualcomm, "Mechanisms for identifying strong gNB interferers" 3GPP TSG RAN WG1 Meeting #94-Bis, Chengdu, China, Oct. 8-12, 2018, R1-1811271, 4 pages.

ZTE, "Consideration on RIM framework and mechanisms for improving network robustness," 3GPP TSG RAN WG1 Meeting #94, Gothenburg, Sweden, Aug. 20-24, 2018, R1-1808325, 7 pages.

ZTE, "Consideration on mechanism for identifying strong gNS interference," R1-1810332, 3GPP TSG RAN WG1 Meeting #94bis Chengdu, China, Oct. 8-12, 2018, 7 pages.

LG Electronics, "Discussion on reference signal design for NR RIM support," 3GPP TSG RAN WG1 Meeting #94bis, R1-1810292, Chungdu, China, Oct. 8-12, 2018, 8 pages.

EPO, Communication under Rule 71(3) EPC for European Application No. 19849276.1, mailed on Jul. 11, 2023, 8 pages.

CNIPA, First Office Action for Chinese Application No. 201980088587. 7, mailed on Jul. 26, 2023, 23 pages with unofficial translation.

International Search Report and Written Opinion in International Application No. PCT/CN2019/071448, mailed Oct. 10, 2019, 7 pages.

* cited by examiner

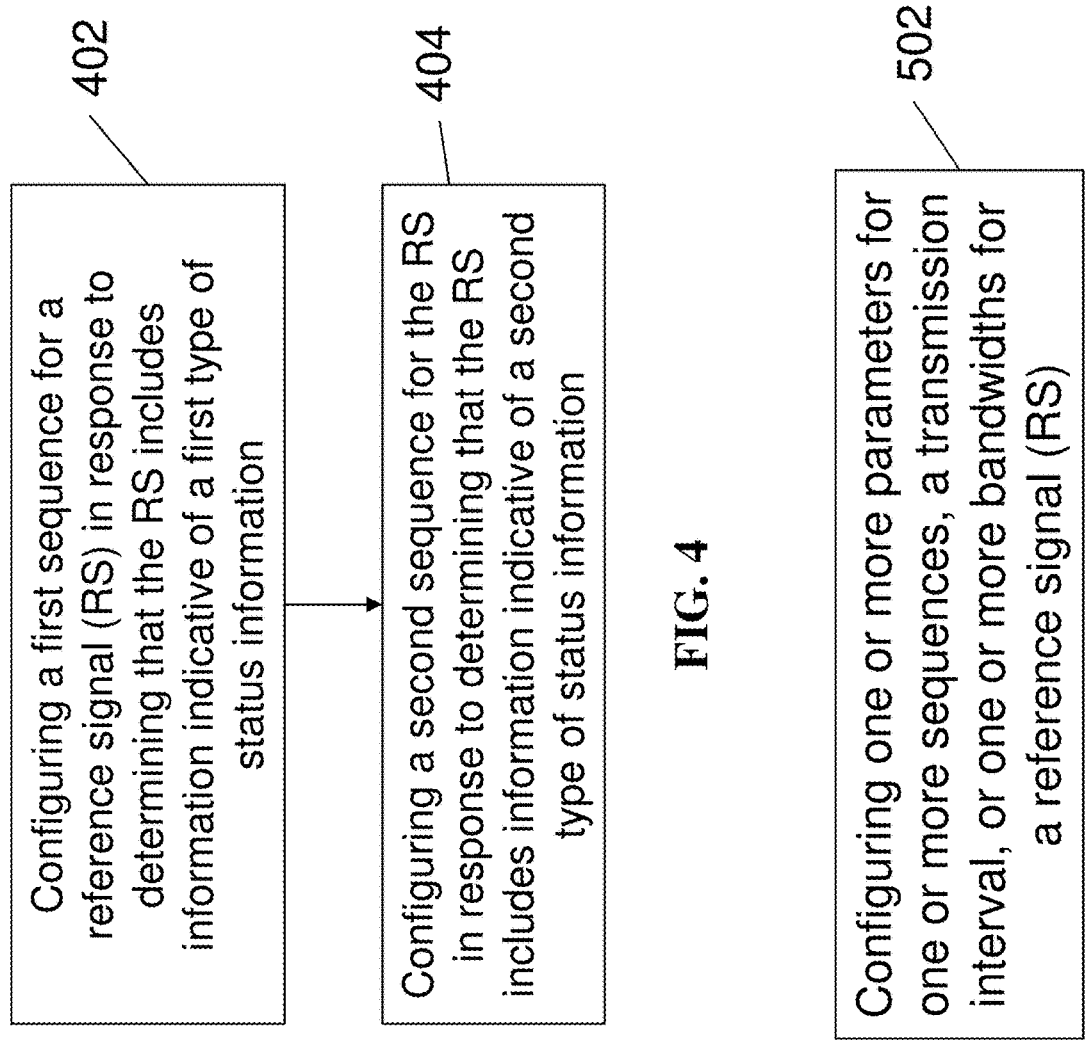

REMOTE INTERFERENCE MITIGATION RESOURCE CONFIGURATION

CROSS-REFERENCE TO RELATED APPLICATIONS

This application is a continuation of International Patent Application No. PCT/CN2019/071448, filed on Jan. 11, 2019, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for configuring resources for remote interference mitigation (RIM). A first exemplary embodiment includes a wireless communication method for configuring a first sequence for a reference signal (RS) in response to determining that the RS includes information indicative of a first type of status information, and configuring a second sequence for the RS in response to determining that the RS includes information indicative of a second type of status information, where the RS is transmitted in response to determining an interference and based on the configured first sequence or second sequence. In some embodiments, the first sequence is selected from a first group of sequences that is based on an identification of a base station or a set to which the base station belongs or an operations, administration, and maintenance (OAM) configuration, and the second sequence is selected from a second group of sequences that is based on a mathematical operation performed on the first sequence. In some embodiments, the first type of status information includes: an absence of atmospheric ducting phenomenon, enough interference mitigation operation, no further actions needed, or an absence of interference.

In some embodiments, the second type of status information includes: a presence of atmospheric ducting phenomenon, not enough interference mitigation operation, further actions needed, or a presence of interference. In some embodiments, the first sequence or the second sequence are configured by a base station or an operations, administration, and maintenance (OAM) entity. In some implementations of the first exemplary embodiment, the RS is a remote interference mitigation (RIM) RS.

A second exemplary embodiment includes a wireless communication method for configuring one or more parameters for one or more sequences, a transmission interval, or one or more bandwidths for a reference signal (RS), where the RS is transmitted in response to determining an interference and based on the configured one or more parameters. The one or more parameters for the second exemplary embodiment include: (1) a time period, or (2) a first bit value associated with a transmission period for transmission of RS, or (3) a second bit value associated with a number of candidate sequences for transmission of RS, or (4) a third bit value associated with a number of candidate bandwidths for transmission of RS, or (5) an identification of a base station or a set to which the base station belongs, or (6) a first set of one or more bits from the first, second, or third bit values or from a combined bits {1, 2, . . . , the first bit value, (the first bit value+1), . . . , (the first bit value+the second bit value), (the first bit value+the second bit value+1), . . . , the third bit value}, where the first set of one or more bits are used to carry the identification of the base station or the set to which the base station belongs, or (7) a second set of one or more bits from the first, second, or third bit values or from a combined bits {1, 2, . . . , the first bit value, (the first bit value+1), . . . , (the first bit value+the second bit value), (the first bit value+the second bit value+1), . . . , the third bit value}, or from the second bit value, where the second set of one or more bits are used for transmission of different kinds of RS, or (8) a third set of one or more bits from the first, second, or third bit values or from a combined bits {1, 2, . . . , the first bit value, (the first bit value+1), . . . , (the first bit value+the second bit value), (the first bit value+the second bit value+1), . . . , the third bit value}, or from the second bit value, where the third set of one or more bits are used for carry an interference mitigation status information, or (9) multiple DL-UL switching or transmission periods, or (10) a time period for transmission of the RS in different DL-UL switching or transmission periods within a RS transmission time period.

In some implementations of the second exemplary embodiment, the RS is a remote interference mitigation (RIM) RS. In some implementations of the second exemplary embodiment, the one or more parameters are configured by the base station or an operations, administration, and maintenance (OAM) entity.

A third exemplary embodiment includes a wireless communication method for configuring one or more parameters for repeated transmission of reference signal (RS), where the RS is repeatedly transmitted in response to determining an interference and based on the configured one or more parameters. The one or more parameters of the third exemplary embodiment include: a number of times to transmit or re-transmit the RS, or a number of times to transmit or re-transmit the RS per switching or transmission period, or a number of time slots between two repeated transmissions of the RS, or a length of time within which the RS is transmitted or re-transmitted, or a time period or a time offset after which the RS is re-transmitted. In some implementations of the third exemplary embodiment, the RS is a remote interference mitigation (RIM) RS. In some implementations of the third exemplary embodiment, the one or more parameters are configured at operation 602 by a base station or an operations, administration, and maintenance (OAM) entity.

A fourth exemplary embodiment includes a wireless communication method for configuring one or more parameters for transmission interval of a reference signal (RS), where the RS is transmitted in response to determining an interference and based on the configured one or more parameters. The one or more parameters of the fourth exemplary embodiment include: multiple transmission positions or resources or configurations for RS in time domain in a downlink-uplink (DL-UL) switching or transmission period, or multiple transmission positions or resources or configurations for RS in time domain in multiple DL-UL switching or transmission periods, where each DL-UL switching or transmission period has one or more transmission positions in time domain, where different DL-UL switching or transmission periods have different transmission positions or resources or configurations, or multiple transmission positions or resources or configurations for RS in time domain in multiple RS transmission periodicities, where each RS transmission periodicity has one or more transmission positions in time domain, and where different RS transmission periodicities have different transmission positions or resources or configurations. In some implementations of the fourth exemplary embodiment, the RS is a remote interference mitigation (RIM) RS. In some implementations of the fourth exemplary embodiment, the one or more parameters are configured by a base station or an operations, administration, and maintenance (OAM) entity.

A fifth exemplary embodiment includes a wireless communication method for configuring a reference signal (RS) to include status information indicative of a first type of status information or a second type of status information, where the first type of status information is transmitting in a first type of time slots or in one or more first type of downlink-uplink (DL-UL) switching periods, or where the second type of status information is transmitted in a second type of time slots or in one or more second type of DL-UL switching periods. In some implementations of the fifth exemplary embodiment, the first type of time slots are odd time slots, the first type of DL-UL switching periods are odd DL-UL switching periods, the second type of time slots are even time slots, and the second type of DL-UL switching periods are even DL-UL switching periods. Or, in some implementations of the fifth exemplary embodiment, the first type of time slots are even time slots, the first type of DL-UL switching periods are even DL-UL switching periods, the second type of time slots are odd time slots, and the second type of DL-UL switching periods are odd DL-UL switching periods. In some implementations of the fifth exemplary embodiment, the RS is a remote interference mitigation (RIM) RS.

A sixth exemplary embodiment includes a wireless communication method for configuring a first reference signal (RS) and a second RS for interference related transmission or reception, where the first RS is transmitted in first type of time slots or in one or more first type of downlink-uplink (DL-UL) switching periods, and where the second RS is received in a second type of time slots or in one or more second type of DL-UL switching periods. In some implementations of the sixth exemplary embodiment, the first type of time slots are odd time slots, the first type of DL-UL switching periods are odd DL-UL switching periods, the second type of time slots are even time slots, and the second type of DL-UL switching periods are even DL-UL switching periods. Or, in some implementations of the sixth exemplary embodiment, the first type of time slots are even time slots, the first type of DL-UL switching periods are even DL-UL switching periods, the second type of time slots are odd time slots, and the second type of DL-UL switching periods are odd DL-UL switching periods. In some embodiments, the RS is a remote interference mitigation (RIM) RS. In some implementations of the sixth exemplary embodiment, the first RS or the second RS are configured by a base station or an operations, administration, and maintenance (OAM) entity.

A seventh exemplary embodiment include a wireless communication method for configuring one or more first type of configurations for a reference signal (RS), a second type of configuration for the RS, or a transmission period for the RS, where the RS is transmitted in response to determining an interference and based on the configured one or more first type of configurations, the second type of configuration or the transmission period. In some implementations of the seventh exemplary embodiment, the one or more first type of configurations includes an offset for transmission of the RS, where the offset is in time domain or in frequency domain. In some implementations of the seventh exemplary embodiment, the one or more first type of configurations includes a reference point for transmission of the RS, where the reference point is in time domain or frequency domain. In some implementations of the seventh exemplary embodiment, the reference point in the time domain includes any one of: a cell boundary, a slot boundary where RS is transmitted, and an uplink-downlink transition period boundary where RS is transmitted.

In some implementations of the seventh exemplary embodiment, the reference point in the frequency domain includes any one of: a lowest subcarrier, a subcarrier in a common resource block, a subcarrier of a lowest-numbered resource block in a control resource set, a center resource element or resource block of synchronization signal block (SSB), or primary synchronization signal (PSS), or secondary synchronization signal (SSS), a lowest-numbered resource element or resource block of SSB or PSS or SSS, a highest-numbered resource element or resource block of SSB or PSS or SSS, a channel raster, and a synchronization raster.

In some implementations of the seventh exemplary embodiment, the second type of configuration is associated with a reference point in a frequency domain, where the reference point includes any one of: a lowest subcarrier, a subcarrier in a common resource block, a subcarrier of a lowest-numbered resource block in a control resource set, a center resource element or resource block of synchronization signal block (SSB), or primary synchronization signal (PSS), or secondary synchronization signal (SSS), a lowest-numbered resource element or resource block of SSB or PSS or SSS, a highest-numbered resource element or resource block of SSB or PSS or SSS, a channel raster, and a synchronization raster.

In some implementations of the seventh exemplary embodiment, the second type of configuration is a non-zero powered configuration for RS that indicates an absence or a presence of the RS transmission during a time period.

In some implementations of the seventh exemplary embodiment, the one or more first type of configurations is configured using a configuration set, where the one or more first type of configurations are consecutive in time domain, and where a position of the one or more first type of configurations within the configuration set is determined based on an offset value or bitmap information. In some implementations of the seventh exemplary embodiment, the offset value is based on an uplink-downlink transition period. In some implementations of the seventh exemplary embodiment, the bitmap information indicates which of the one or more first type of configurations is used for transmission of the RS.

In some implementations of the seventh exemplary embodiment, the configuration set is associated with a reference point in a frequency domain, where the reference point includes any one of: a lowest subcarrier, a subcarrier in a common resource block, a subcarrier of a lowest-numbered resource block in a control resource set, a center resource element or resource block of synchronization signal block (SSB), or primary synchronization signal (PSS), or secondary synchronization signal (SSS), a lowest-numbered resource element or resource block of SSB or PSS or SSS, a highest-numbered resource element or resource block of SSB or PSS or SSS, a channel raster, and a synchronization raster.

In some implementations of the seventh exemplary embodiment, the transmission period is a sum of a plurality of configuration sets for the RS, where time domain positions of the configuration sets within the transmission period is based on an offset value, an identification of a base station, or an identification of a set to which the base station belongs. In some implementations of the seventh exemplary embodiment, the RS is a remote interference mitigation (RIM) RS.

In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 4 shows an exemplary flowchart for configuring multiple sequences for RS.

FIG. 5 shows an exemplary flowchart for configuring one or more parameters for one or more sequences, a transmission interval, or one or more bandwidths for RS.

DETAILED DESCRIPTION

Figure 1:
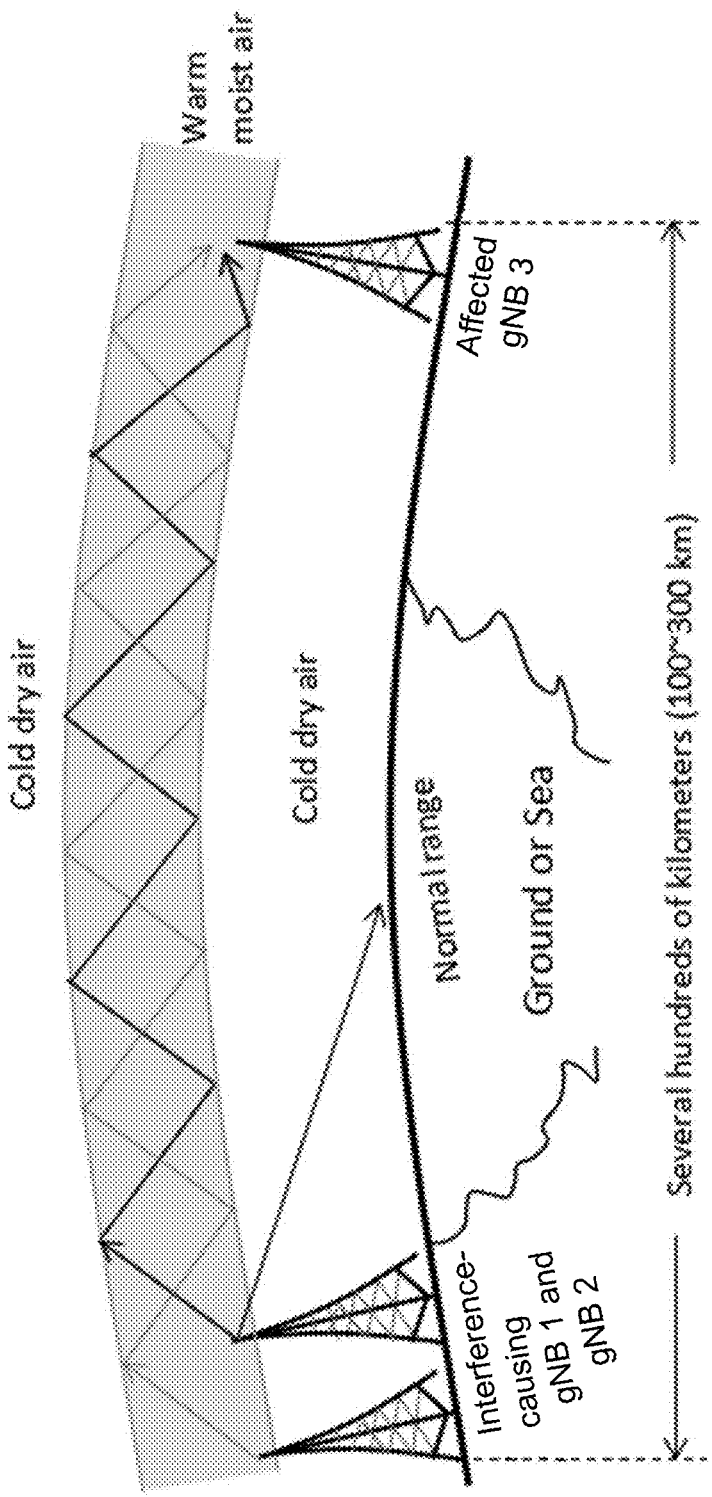
FIG. 1 shows an example remote interference being caused by an atmospheric duct.

Under certain weather conditions, electromagnetic waves propagating in the atmosphere, especially in the troposphere, are influenced by atmospheric refraction, and their propagation trajectories will be bent to the ground. Some of the electromagnetic waves will be trapped in a thin atmospheric layer with a certain thickness, just as the electromagnetic waves propagate in a metal duct. This phenomenon is known as the propagation of electromagnetic waves through the atmospheric duct (also named tropospheric duct). Atmospheric duct makes the signal transmitted by the base station can reach hundreds of kilometers away with little pathloss, as illustrated in FIG. 1.

Figure 2:
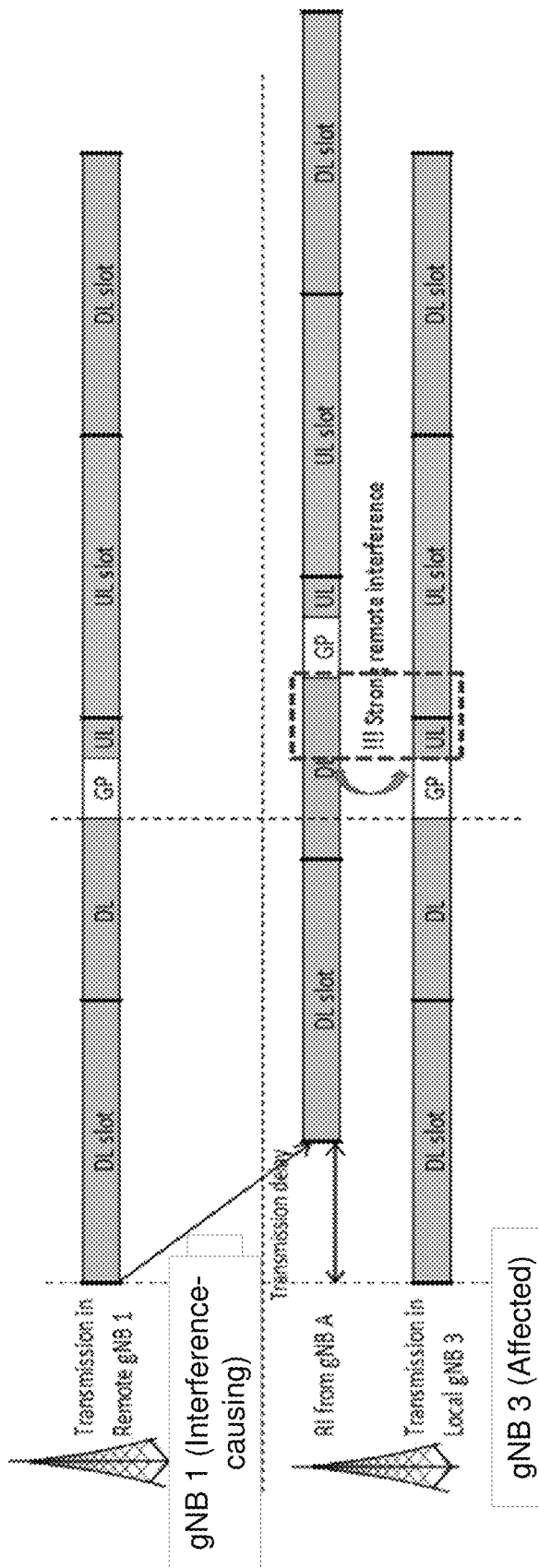
FIG. 2 shows an example of remote interference in a time-domain duplexing system.

TDD (Time Division Duplex) system uses TDD duplex mode. The uplink and downlink signals are sent through different time periods on the time axis in the same frequency band. For example, there are three types of subframe structure, i.e. downlink subframes, uplink subframe, and special subframe in the TD-LTE. All symbols in the downlink subframe can be downlink symbols, all symbols in the uplink subframe can be uplink symbols. Special subframe includes three parts, e.g., the downlink part of the special subframe known as downlink pilot time slot (DwPTS), guard period (GP), and the uplink part of the special subframe known as the uplink pilot time slot (UpPTS). GP, in which the device does not transmit any signal, provides protection between uplink signals and downlink signals, and avoids cross-link interference between uplink and downlink. However, when atmospheric duct occurs, downlink signal from remote gNB is still strong enough after, for example, hundreds of kilometers transmission. This will cause severe interference to uplink reception of local gNB if the transmission delay exceeds the length of GP, as shown in FIG. 2.

In the commercial TD-LTE network, the remote interference (RI) caused by atmospheric duct was further identified. It was observed in relatively large scale of TD-LTE eNBs (eNodeB) that IoT in these eNBs intermittently deteriorated to severely impact the network coverage and connection successful rate. This kind of IoT degradation was caused by the DL signal of remote eNB as long as the atmospheric conditions favorable for producing troposphere bending of radio waves are available.

In order to solve the problem of remote interference or above cross-link interference or other interference type(s), Operations, Administration and management (OAM) or the base station can configure the resources in terms of sequence, time and frequency domain to send remote interference mitigation (RIM) reference signal (RS) correctly in order to effectively determine the type of interference, or the source of interference, and further reduce interference.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only and may be used in wireless systems that implemented other protocols.

I. FRAMEWORKS AND WORKFLOWS FOR NEW RADIO (NR) RIM

Framework-1, Framework-2.1. Framework-2.2 below are used as starting point, using Framework-0 as basis for comparison.

Note that not all the steps need to be included when making use of a given framework. An aggressor may also be a victim (and vice versa) at least for scenario #1. Information reporting to OAM from both aggressor gNB and victim gNB is supported. As shown in FIG. 1, an aggressor node may be an interference causing node, such as gNB1 and/or gNB2, and a victim node may be an affected node, such as gNB3.

A. Framework-0

Figure 3A:
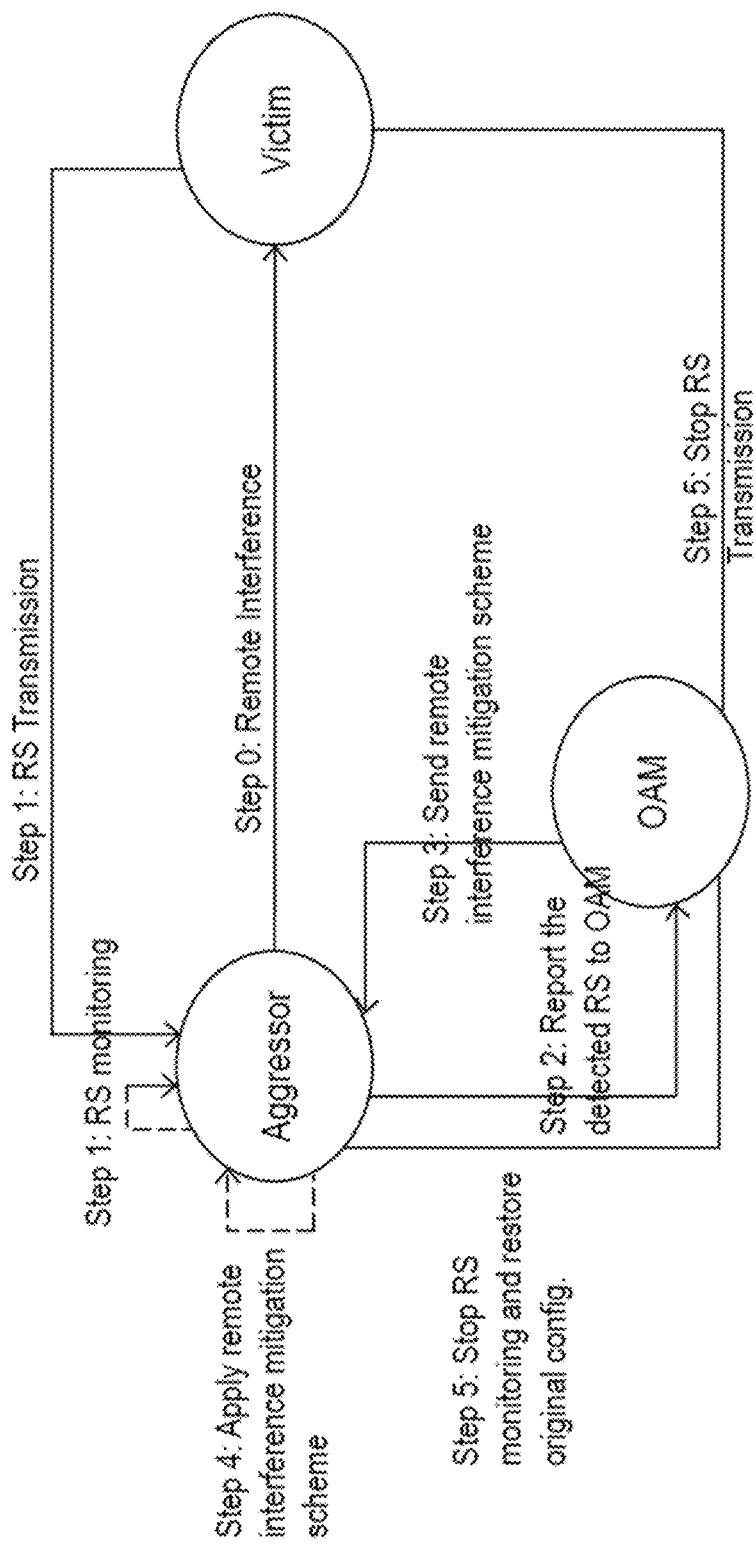
FIG. 3A shows a flow diagram for remote interference mitigation (RIM) Framework-0.

FIG. 3A shows a flow diagram for RIM Framework-0.
Workflow of Framework-0
Step 0: Atmospheric ducting phenomenon happens, and the remote interference appears
Step 1:
Victim experiences "sloping" like IoT increase and start RS transmission. Aggressor starts monitoring RS as configured by OAM
Step 2: Upon reception of RS, Aggressor reports the detected RS to OAM
Step 3: OAM sends remote interference mitigation scheme to Aggressor
Step 4: Aggressor applies remote interference mitigation scheme
Step 5: OAM stops RS monitoring and restores original config. at aggressor side and stop RS transmission at victim side.

B. Framework-1

Figure 3B:
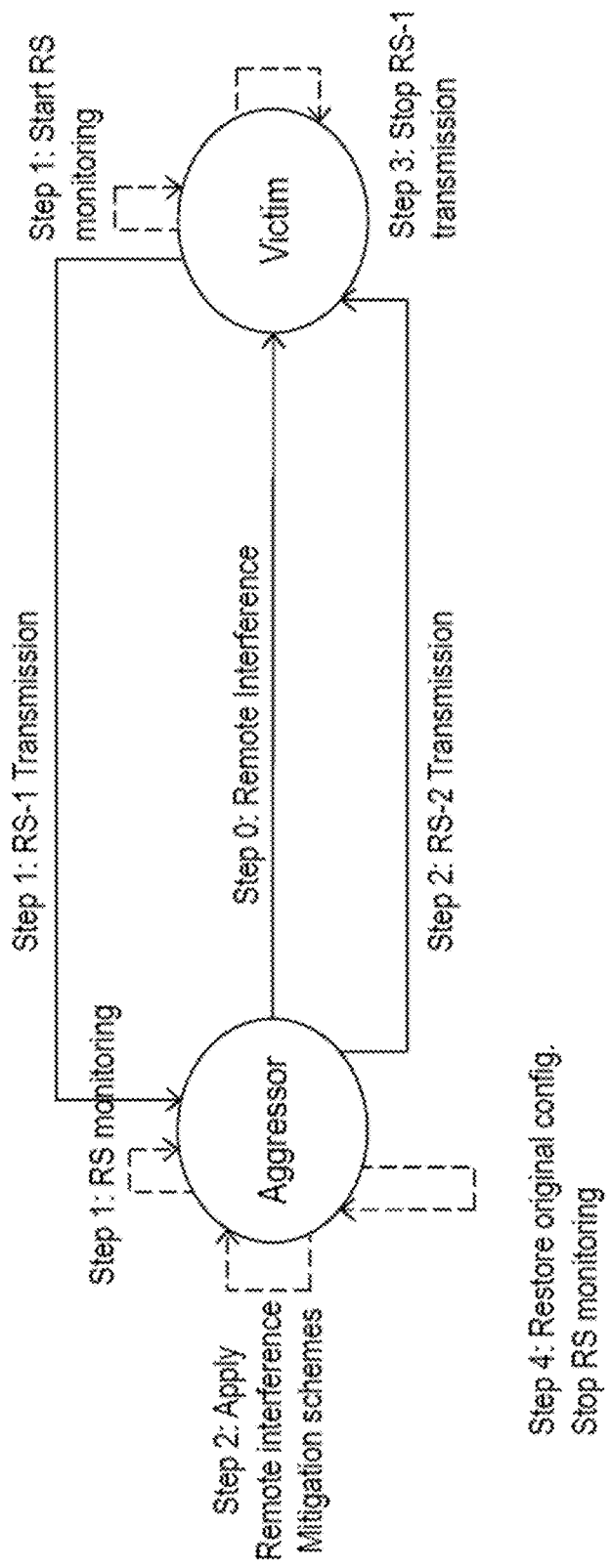
FIG. 3B shows a flow diagram for RIM Framework-1.

FIG. 3B shows a flow diagram for RIM Framework-1.
Workflow of Framework-1 is described as follows:
Step 0: Atmospheric ducting phenomenon happens, and the remote interference appears.
Step 1: Victim experiences "sloping" like IoT increase and start RS transmission/monitoring. This RS marked as RS-1 is used to assist aggressor(s) to recognize that they are causing remote interference to the victim and to detect/deduce how many UL resources of the victim are impacted by the aggressors. Aggressor starts monitoring RS as configured by OAM or when it experiences remote interference with "sloping" IoT increase.
Step 2: Upon reception of RS-1, Aggressor starts remote interference mitigation solutions such as muting some DL transmission symbols and transmits RS to inform victim that the atmospheric ducting phenomenon still exist. This RS marked as RS-2 is used to assist the victim to decide whether the atmospheric ducting phenomenon still exist. It does not preclude the possibility of using RS-2 for other purposes.
Step 3: Victim continues RS-1 transmission if RS-2 is detected. Victim may stop RS-1 transmission if RS-2 is not detected and the IoT going back to certain level.
Step 4: Aggressor continue remote interference mitigation while receiving RS-1. Upon "disappearance" of RS-1, Aggressor restores original configuration when "disappearance" of RS-1.

C. Framework-2.1

Figure 3C:
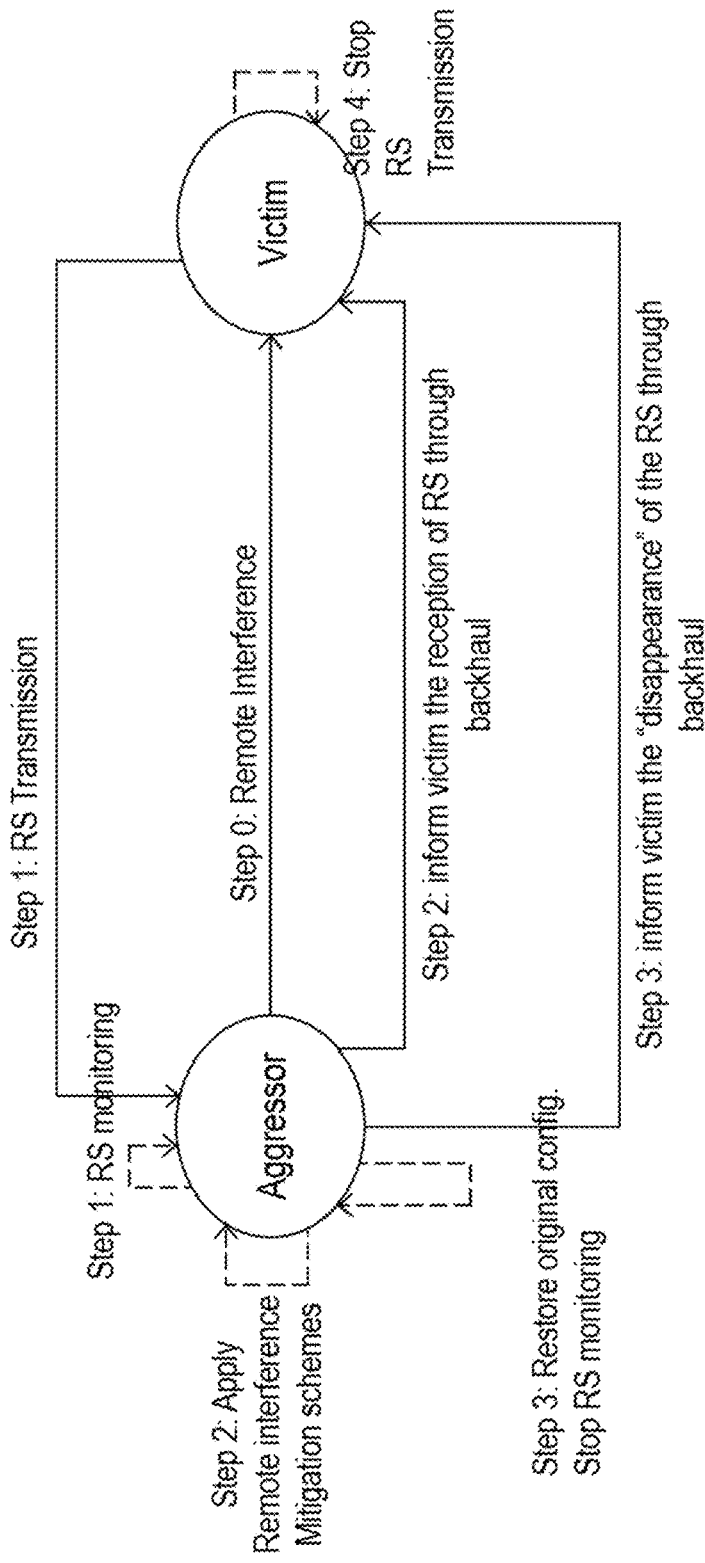
FIG. 3C shows a flow diagram for RIM Framework-2.1.

FIG. 3C shows a flow diagram for RIM Framework-2.1.
Workflow of Framework-2.1
Step 0: Atmospheric ducting phenomenon happens, and the remote interference appears.
Step 1: Victim experiences "sloping" like IoT increase and start RS transmission. A set of gNBs might use the same RS, which may carry the set ID. Aggressor starts monitoring RS as configured by OAM or when it experiences remote interference with "sloping" IoT increase.
Step 2: Upon reception of RS, Aggressor informs the set of victim gNB(s) of the reception of RS through backhaul and apply interference mitigation scheme. Message exchange in Step 2 could include other information, pending on further study.
Step 3: Upon "disappearance" of RS, Aggressor informs the set of Victim gNB(s) the "disappearance" of RS through backhaul and restore original configuration.
Step 4: Victim stop RS transmission upon the reception of the "disappearance of RS" information through backhaul

D. Framework-2.2

Figure 3D:
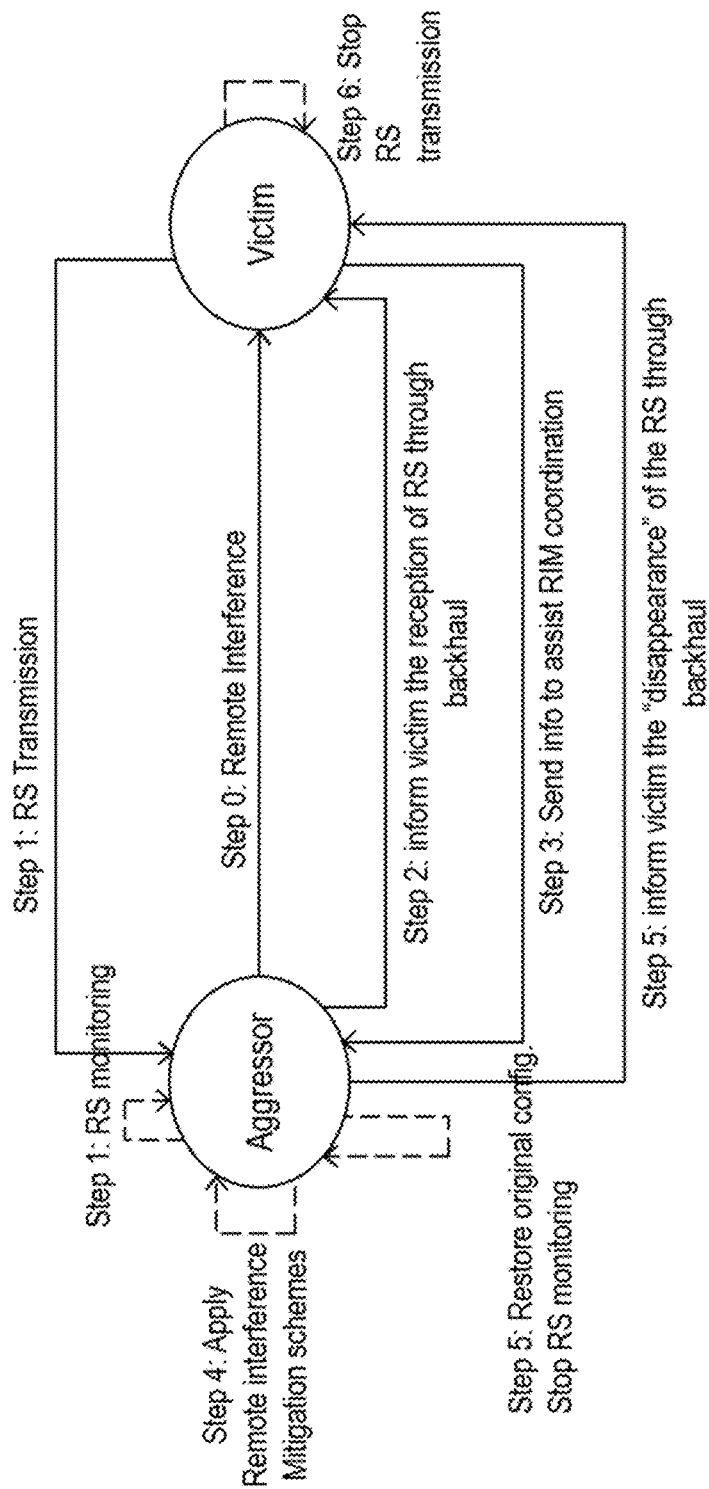
FIG. 3D shows a flow diagram for RIM Framework-2.2.

FIG. 3D shows a flow diagram for RIM Framework-2.2.
Workflow of Framework-2.2 is described as follows:
Step 0: Atmospheric ducting phenomenon happens and the remote interference appears.
Step 1: Victim experiences "sloping" like IoT increase and start RS transmission. A set of gNBs might use the same RS, which may carry the set ID. Aggressor starts monitoring RS as configured by OAM or when it experiences remote interference with "sloping" IoT increase.
Step 2: Upon reception of RS, Aggressor informs the set of victim gNB(s) of the reception of RS through backhaul
Step 3: Upon reception of the "reception of RS" information received in the backhaul, victim sends information to assist RIM coordination
Step 4: Aggressor applies remote interference mitigation scheme
Step 5: Upon "disappearance" of RS, Aggressor informs Victim the "disappearance" of RS through backhaul.
Step 6: Victim stop RS transmission upon the reception of the "disappearance of RS" info through backhaul

II. RIM RESOURCE CONFIGURATION OPERATIONS

The technology described in this patent document provides an exemplary method and device for resource configuration to solve the problem of remote interference or cross-link interference in a wireless communication system.

In a method, a RIM reference signal RS-1 is transmitted by a first equipment, e.g., the interfered gNB (also known as the victim or affected node), to the second equipment, e.g., the interfering gNB (also known as the aggressor or interference causing node). RS-1 is transmitted for any one or more of the following example functions:
1. Being able to provide information whether the atmospheric ducting phenomenon exists
2. Being able to assist the interfering gNB to identify how many uplink (UL) orthogonal frequency division multiplexed (OFDM) symbols received by the interfered gNB that the interfering gNB impacted.
3. Being able to carry enough information to enable the information exchange through backhaul (e.g., gNB set ID).
4. Carrying the information, such as one or more of the following information "ducting phenomenon does not exist" or "ducting phenomenon exists", "enough mitigation" or "not enough mitigation", "no further actions needed" or "further actions needed", "interference does not exist" or "interference still exists", "interfered the number of UL interfered resources or UL interfered symbols", "the slot or symbol format information of the first equipment".

RIM reference signal RS-2 is transmitted by the second equipment, e.g. the interfering gNB, to the first equipment, e.g., the interfered gNB. RS-2 is transmitted at least for the following example functions:

1. Being able to provide information whether the atmospheric ducting phenomenon exists There are some operations or functions as follows that may need to be supported or satisfied for mitigating remote interference, and may also be suitable the mitigation schemes for cross-link interference or other interference type(s).

A. Operation 1: Distinguishable RIM Reference Signals (RS-1 and RS-2)

In some frameworks, e.g. framework 2.1 and 2.2, RIM RS-2 cannot be transmitted by the second equipment e.g. the interfering gNB. However, if RS-2 is configured, RS-1 and RS-2 should be distinguishable and are separately configured, due to RS-1 and RS-2 have different functions. They are also transmitted by the gNBs playing different roles. Thus, as further explained in the embodiments below, the configuration(s) performed by OAM and/or the equipment, e.g. the interfered gNB or interfering gNBs can be supported to distinguish RIM RS-1 and RS-2.

B. Operation 2: Multiple RIM RS Resources (or Configurations) for RS Detection of the gNBs with Different Distances In general, the equipment e.g., the gNB is not expected to receive RS before the DL transmission boundary (described in 3GPP TS 38.866-16.0.0), and not expected to transmit RS after the UL reception boundary (described in 3GPP TS 38.866-16.0.0). In other words, the equipment e.g., the gNB is not expected to receive RS at least in DL slot or DL symbols, and not expected to transmit RS at least in UL slot or UL symbols.

Due to the larger subcarrier spacing permitted in NR e.g. 30 kHz, if the first gNB (e.g. interfered gNB) transmits RIM RS (RS-1 or RS-2) on the symbol(s) immediately before the DL transmission boundary, the second gNB (e.g. interfering gNB) may not detect the RIM RS on flexible symbols, or GP (guard period) symbols, or UL symbols, because the RIM RS may drop in the DL symbols in next DL-UL switching/transmission period at the second gNB side. This case usually happens when two gNBs are far away from each other. Conversely, when the two gNBs are relatively close, the second gNB will also not detect the RIM RS on non-DL symbols if the first gNB transmit RIM RS on the symbols far before the DL transmission boundary.

To avoid the above problems or to allow the reception gNBs to detect RIM RS both when the reception gNBs are far from or near to the transmission gNB, a gNB can be configured with multiple RIM RS resources (or configurations) in a configured RIM RS periodicity or in a DL-UL switching or transmission period. For example, in a configured RIM RS periodicity or in a DL-UL switching or transmission period, the gNB can transmit multiple RIM RS on different resources or configurations or on different symbol(s). These RIM RS resources or configurations or symbols can be continuous or discontinuous in time domain. Or a gNB can be configured with longer length RIM RS to avoid the above problems. In some embodiments, a RIM RS may include two symbols with two concatenated copies of the RS sequence, but the RIM RS can also be configured with more than two symbols with more than two concatenated copies of the RS sequence.

Therefore, OAM and/or the equipment e.g. the gNBs can be configured to support multiple RIM RS resources or configurations in a periodicity.

C. Operation 3: Repetition Transmission of RIM RS (RS-1 or RS-2)

In order to improve the detection performance of RIM RS (e.g. RS-1 or RS-2), the configuration(s) for repetition transmission of RIM RS in time or frequency domain can be supported.

D. Operation 4: Convey the Interference Mitigation Status Information

The first equipment e.g. the interfered gNB can convey the interference mitigation status information to the second equipment e.g. the interfering gNB, such as one or more of the following information "ducting phenomenon does not exist" or "ducting phenomenon exists", "enough mitigation" or "not enough mitigation", "no further actions needed" or "further actions needed", "interference does not exist" or "interference still exists", "interfered the number of UL interfered resources or UL interfered symbols", or "the slot or symbol format information".

One or more configurations to support above information transfer can be defined.

E. Operation 5: Convey the Equipment (e.g. the gNB or gNB Set) Identification Information RIM RS can carry enough information e.g. the gNB identification or gNB set identification to enable the information exchange through backhaul.

In order to satisfy at least the above Operations 1-5 and functionalities in each operation, OAM can configure the equipment e.g. the gNB and/or the gNB can configure itself in terms of sequence type, time and frequency transmission resources or pattern. The follow embodiments or the combinations of one or more embodiments provide example methods to solve above problems.

III. EXEMPLARY EMBODIMENTS TO CONFIGURE RIM RESOURCES

A. Embodiment 1

For Operation 4, RIM RS-1 may carry or include the interference mitigation status information, e.g., "ducting phenomenon does not exist" or "ducting phenomenon exists", or "enough mitigation" or "not enough mitigation", or "no further actions needed" or "further actions needed", or "interference does not exist," or "interference still exists", or other information listed in above contents or described in this patent document. In order not to increase the number of RS-1 candidate sequences and detection complexity, the following example method is provided: assume the candidate sequences of RS-1 are given as follows: {seq0, seq1, seq2, seq3, seq4, seq5, seq6, seq7}. According to the first equipment identification (ID), e.g. the interfered gNB (or gNB set) ID and/or according to other operations, OAM or the first equipment can configure seq2 as the basic sequence for RS-1 transmission. In some embodiments, an OAM can configure the candidate sequence for a RS, such as either RS-1 or RS-2.

In order to carry the information "ducting phenomenon does not exist", "enough mitigation", "no further actions needed", or "interference does not exist", OAM or the first equipment can configure seq2 as the RS-1 sequence;

On the contrary, in order to carry the information "ducting phenomenon exists", "not enough mitigation", "further actions needed", or "interference still exist", OAM or the first equipment can configure one sequence in the set $\{-seq2, i*seq2, -i*seq2, (+/-1+/-1*i)^n*seq2,$ conjugate (seq2), bit reverse of seq2} as the RS-1 sequence, where "i" is a symbol to indicate imaginary part.

In some embodiments, the actual RS-1 sequence can be given by:

If the sequence is modulated and each value in it is a complex number, then,
- RS-1 sequence=$(-1)^n$*a candidate sequence of RS-1, or
- RS-1 sequence=$(i)^n$*a candidate sequence of RS-1, or
- RS-1 sequence=$(-i)^n$*a candidate sequence of RS-1, or
- RS-1 sequence=$p* (+/-1+/-1*i)^n$*a candidate sequence of RS-1, or
- RS-1 sequence=conjugate (a candidate sequence of RS-1), or not conjugate, or If the sequence is not modulated and each value in it is a bit (0 or 1), then,
- RS-1 sequence=Bit reverse of a candidate sequence of RS-1 (bit=1 in RS-1 sequence if bit=0 in the candidate sequence, bit=0 in RS-1 sequence if bit=1 in the candidate sequence), or not bit reverse.

where p is a power normalization factor, e.g., p equals to 1/sqrt(2) or 1; where n=0 (or n=1), if the information that needs to be carried is "ducting phenomenon does not exist", "enough mitigation", "no further actions needed", or "interference does not exist", and RS-1 sequence is a candidate sequence x; and where n=1 (or n=0) if the information that needs to be carried is "ducting phenomenon exists", "not enough mitigation", "further actions needed", or "interference still exist" and RS-1 sequence is a transformation of the candidate sequence x (n=1, or conjugate, or bit reverse), and vice versa.

B. Embodiment 2

At first, the following concepts will be described: RIM RS transmission periodicity, DL-UL switching/transmission period.

One DL-UL switching/transmission period (e.g. configured by tdd-UL-DL-ConfigurationCommon and/or tdd-UL-DL-ConfigurationCommon2 described in 3GPP TS38.213-15.3.0) usually includes three parts in turn: DL slot(s), flexible part (DL symbols, flexible symbols, UL symbols), and UL slot(s). A DL-UL switching/transmission period may be equivalent to the periodicity of the TDD DL/UL pattern.

The RIM RS transmission periodicity can be a multiple of the periodicity of the TDD DL/UL pattern (i.e. DL-UL switching/transmission period), or a multiple of the combined periodicity, if two TDD DL/UL patterns (e.g. tdd-UL-DL-ConfigurationCommon and tdd-UL-DL-ConfigurationCommon2) are configured.

In order to satisfy at least the above Operations 1-5 and functionalities in each operation, OAM and/or the gNB can configure different sequence (code division multiplexed (CDM)), different basic time period (TDM), and/or different bandwidth (FDM) to transmit RIM RS.

TDM: OAM or the gNB configures one or multiple of a DL-UL switching or transmission period or a combined periodicity if two TDD DL/UL patterns are configured, or a fixed time period (e.g. 5 ms or 10 ms) as a basic time period. In general, a fixed time period or a basic time period is more than or equal to a DL-UL switching/transmission period or a combined periodicity. In other words, a fixed time period or a basic time period is a multiple of a DL-UL switching/transmission period or a combined periodicity.

RIM RS transmission periodicity=$2^{n0}$*a basic time period, where n0 is an integer greater than or equal to 0 and can be configured by OAM or the gNB. TDM method can provide up to $2^{n0}$ distinguishable RIM RS resources.

CDM: OAM or the gNB configures $2^{n1}$ candidates sequences for RIM RS transmission, where n1 is an integer greater than or equal to 0 and can be configured by OAM or the gNB. CDM method can provide up to $2^{n1}$ distinguishable RIM RS resources.

FDM: OAM or the gNB configures $2^{n2}$ candidate bandwidths (e.g. each with 20 MHz) for RIM RS transmission, where n2 is an integer greater than or equal to 0 and can be configured by OAM or the gNB. FDM method can provide up to $2^{n2}$ distinguishable RIM RS resources.

TABLE 1

The number of distinguishable RIM RS resources

| | TDM a basic time period (e.g. 10 ms) | CDM sequence | FDM System bandwidth (MHz), e.g. 80 MHz | Total number | a RIM RS transmission periodicity |
|---|---|---|---|---|---|
| Multiplexing resource size the number of bits | $2^{16}$ ($2^{n0}$) n0 = 16 | 8 ($2^{n1}$) n1 = 3 | 1($2^{0}$) n2 = 0 (Disable FDM method ) | $2^{19}$ = 524288 n0 + n1 + n2 = 19 | $2^{16}$*10 ms = 655.36 seconds |

To sum up, the OAM can configure the gNB or the gNB can configure by itself at least one of the following parameters or information:

1. a basic time period (one or multiple of a DL-UL switching/transmission period or a combined periodicity, or a fixed time period (e.g. 5 ms or 10 ms)); or
2. n0 and/or the value of n0 bits, no to define a RIM RS transmission periodicity for RIM RS. The value of n0 bits can indicates RIM RS is transmitted in which basic time period; or
3. n1 and/or the value of n1 bits, n1 to define the number of RIM RS candidate sequences. The value of n1 bits can indicates RIM RS is based on which candidate sequence; or
4. n2 and/or the value of n2 bits, n2 to define the number of RIM RS candidate bandwidths. The value of n2 bits can indicates RIM RS is transmitted on which candidate bandwidth; or
5. The gNB identification or the gNB set identification; or
6. Which bits in n0, n1, and/or n2 bits or in the combined bits {1, 2, . . . , n0, n0+1, . . . , n0+n1, n0+n1+1, . . . , n2} are used to carry the gNB identification or the gNB set identification. One or more parameters of n0, n1 or n2 can be not configured. The order of n0, n1, and/or n2 in the bits set can be adjusted. Above two sentence can also be suitable for other item; or 7. Which bits in n0, n1, and/or n2 bits or in the combined bits {1, 2, ..., n0, n0+1, ..., n0+n1, n0+n1+1, ..., n2} or which bits in n1 bits are used for RIM RS-1 or RIM RS-2 transmission; or
8. Which bits in n0, n1, and/or n2 bits or in the combined bits {1, 2, ..., n0, n0+1, ..., n0+n1, n0+n1+1, ..., n2} or which bits in n1 bits are used for carry the interference mitigation status information, e.g. "Enough mitigation" or "Not enough mitigation". "no further actions needed" or "further actions needed", "interference does not exist" or "interference still exists"; or
9. Multiple DL-UL switching/transmission periods are configured within a RIM RS transmission periodicity, e.g. for RIM RS repetition transmission or multiple RIM RS resources (or configurations); or
10. Time occasions for RIM RS transmission located in different DL-UL switching/transmission periods within a RIM RS transmission periodicity. E.g. in 1st, 3rd, 5th and 7th DL-UL switching/transmission period are configured with 1st, 2nd, 3rd, 4th time occasion. Or, in the first four consecutive DL-UL switching/transmission periods, there are four consecutive time occasions. There is one or more RIM RS resource/configuration in each time occasion.

C. Embodiment 3

For Operation 3 of repetition transmission of RIM RS (RS-1 or RS-2), OAM and/or the equipment e.g. the gNBs can configure one or more of the following parameters. In general, repetition transmission can be limited to a basic time period.
1. Repetition times, to indicate the times of RIM RS repetition transmission; or
2. Repetition granularity, e.g. repeat in DL-UL switching/transmission periods. For example, if repetition times=8, the gNB needs 8 DL switching/transmission periods to repeatedly transmit RIM-RS. The repetition granularity may equal a DL-UL switching/transmission period; or
3. Repetition spacing, to indicate the spacing between two repetition transmission. The OAM or the gNB can configure continuous repetition, e.g. slot 0-slot 4, slot 5-slot 9, slot 10-slot 14, ..., or discontinuous repetition, e.g. slot 0-slot 4, slot 10-slot 14, ..., Repetition spacing may equal 5 slots; or
4. Repetition time length or repetition range, to indicate how long the RIM RS can be sent repeatedly; or
5. Repetition period and/or offset, e.g. repetition period=10 ms, Repetition granularity=a DL-UL switching/transmission period (5 ms), The RIM RS will be transmitted repeatedly in first DL-UL switching/transmission period, third DL-UL switching/transmission period, fifth DL-UL switching/transmission period, ....

D. Embodiment 4

For Operation 2 of multiple RIM RS resources (or configurations) in a periodicity, OAM and/or the equipment e.g. the gNBs can configure one or more of the following parameters or information:
1. Multiple transmission positions/resources/configurations for RIM RS in time domain in a DL-UL switching/transmission period. For example, the first one position is located at the DL/flexible symbols before and far from the DL transmission boundary, and the second one is located at the DL/flexible symbols immediately before the DL transmission boundary; or
2. Multiple transmission positions/resources/configurations for RIM RS in time domain in multiple DL-UL switching/transmission periods. Each DL-UL switching/transmission period has one or more transmission positions in time domain. But different DL-UL switching/transmission periods may have different transmission positions/resources/configurations. In some embodiments, OAM and/or gNB can configure the number or time resources of multiple transmission positions/resources/configurations, DL-UL switching/transmission periods; or
3. Multiple transmission positions/resources/configurations for RIM RS in time domain in multiple RIM RS transmission periodicities. Each RIM RS transmission periodicity has one or more transmission positions in time domain. But different RIM RS transmission periodicities may have different transmission positions/resources/configurations;
4. The combination of above numbers 1-3. For above 1 and 2, multiple RIM RS resources (or configurations) can be limited to a basic time period.

E. Embodiment 5

Embodiment 1 and 5 can be considered different solutions to solve the same problem.

For Operation 4, RIM RS-1 may need to carry the interference mitigation status information, e.g., "ducting phenomenon does not exist" or "ducting phenomenon exists", "enough mitigation" or "not enough mitigation", "no further actions needed" or "further actions needed", or, "interference does not exist" or "interference still exists", or other information listed in above contents.

For example, "enough mitigation" or "not enough mitigation" can be configured via separate configuration using different time occasions (or different DL-UL switching periods). If RS-1 is to be configured, the RIM RS-1 is configured in one or more odd time occasions, or in one or more odd DL-UL switching periods. If RS-2 is to be configured, the RIM RS-2 is configured in one or more even time occasions, or in one or more even DL-UL switching periods. Or, the former RIM RS-1 is sent in even occasions/periods, and the latter RIM RS-2 is sent in odd occasions/periods.

F. Embodiment 6

For Operation 1, the configuration(s) performed by OAM and/or the equipment e.g. the interfered/interfering gNBs can be supported to distinguish RIM RS-1 and RS-2.

RIM RS-1 and RS-2 can be carried via separate configuration using different time occasions (or different DL-UL switching periods). If RS-1 needs to be informed, the RS-1 is transmitted in one or more odd time occasions, or in one or more odd DL-UL switching periods. If RS-2 needs to be informed, the RS-2 is transmitted in one or more even time occasions, or in one or more even DL-UL switching periods. Or, the former RIM RS-1 is sent in even occasions/periods, and the latter RIM RS-2 is sent in odd occasions/periods.

G. Embodiment 7

The RIM RS configuration may include at least one of the following: basic RIM RS configuration, RIM RS configuration, transmission periodicity.

In some embodiment, the basic RIM RS configuration corresponds to a UL-DL transition periodicity. In some embodiment, the offset of RIM RS within the configuration is denoted by offset-RS-time in time domain. In some embodiment, the offset of RIM RS within the configuration is denoted by offset-RS-freq in frequency domain. In some embodiment, a RIM RS configuration is associated with a reference point in frequency domain.

In some embodiment, the reference point of the RIM RS in time domain includes one of the following: the down-link or up-link boundary of the cell, the down-link or up-link boundary of the slot where RS is transmitted, the boundary of the slot where RS is transmitted, the boundary of the UL-DL transition period where RS is transmitted.

In some embodiment, the reference point of the RIM RS in frequency domain includes one of the following: the point A (e.g., a lowest subcarrier), the subcarrier 0 in common resource block 0, subcarrier 0 of the lowest-numbered resource block in the control resource set CORESET if the CORESET is configured by the PBCH or by the controlResourceSetZero field in the PDCCH-ConfigCommon IE, the center resource element or resource block of synchronization signal block (SSB) (SS/PBCH) or primary synchronization signal (PSS) or secondary synchronization signal (SSS), the lowest-numbered resource element or resource block of SSB or PSS or SSS, the highest-numbered resource element or resource block of SSB or PSS or SSS, the channel raster, or the synchronization raster.

In some embodiment, a RIM RS configuration is associated with a reference point in frequency domain. In some embodiment, the reference point in frequency domain includes one of the following: the point A (e.g., a lowest subcarrier), the subcarrier 0 in common resource block 0, subcarrier 0 of the lowest-numbered resource block in the CORESET if the CORESET is configured by the PBCH or by the controlResourceSetZero field in the PDCCH-ConfigCommon IE, the center resource element or resource block of SSB (SS/PBCH) or primary synchronization signal (PSS) or secondary synchronization signal (SSS), the lowest-numbered resource element or resource block of SSB or PSS or SSS, the highest-numbered resource element or resource block of SSB or PSS or SSS, the channel raster, or the synchronization raster.

In some embodiment, RIM RS configuration is non-zero powered RIM RS configuration or zero-powered RIM RS configuration. In some embodiment, the zero-powered RIM RS configuration indicates that during its corresponding period, no RIM RS is transmitted. In some embodiment, the non-zero-powered RIM RS configuration indicates that during its corresponding period, the RIM RS is transmitted.

In some embodiment, the RIM RS configuration set is comprised of n basic RIM RS configurations, where n is a non-negative integer. In some embodiment, the n basic RIM RS configurations in the RIM RS configuration set could be consecutive in time domain. The position of the RIM RS configuration within the RIM RS configuration set is decided by at least one of the following: offset value, bitmap information.

In some embodiment, the position of the first/center/last RIM RS configuration relative to the configuration set is represented by offset-config. In some embodiment, the offset is numbered by UL-DL transition periodicity. In one example, when the offset-config equals 1, the RIM RS configuration is started from the second UL-DL transition periodicity within the RIM RS configuration set.

In some embodiment, the position of the n basic RIM RS configurations within the RIM RS configuration set could be denoted in a bitmap format. In one example, the information convey bitmap is "0011". The RIM RS configuration is comprised of four RIM RS configurations. The gNB or gNB set should transmit RIM RS in the third and fourth RIM RS configurations within the corresponding RIM RS configuration set. In another example, the information convey bitmap is "0011". The RIM RS configuration is comprised of four RIM RS configurations. The first two RIM RS configurations within the RIM RS configuration set are zero-powered RIM RS configurations. The last two RIM RS configurations within the RIM RS configuration set are zero-powered RIM RS configurations. In some embodiment, functionalities of the RIM RS could be distinguished by the information conveyed by the bitmap.

In some embodiment, a RIM RS configuration set is associated with a reference point in frequency domain. In some embodiment, the reference point in frequency domain includes one of the following: the point A (e.g., a lowest subcarrier), the subcarrier 0 in common resource block 0, subcarrier 0 of the lowest-numbered resource block in the CORESET if the CORESET is configured by the PBCH or by the controlResourceSetZero field in the PDCCH-ConfigCommon IE, the center resource element or resource block of SSB (SS/PBCH) or primary synchronization signal (PSS) or secondary synchronization signal (SSS), the lowest-numbered resource element or resource block of SSB or PSS or SSS, the highest-numbered resource element or resource block of SSB or PSS or SSS, the channel raster, or the synchronization raster.

In some embodiment, the RIM RS transmission periodicity is the sum of multiple RIM RS transmission configuration sets. The position of the RIM RS configuration set within the transmission periodicity in time domain is decided by offset-config set. In some embodiment, the offset is numbered by UL-DL transition periodicity. In one example, when the offset-config set equals 1, it indicates the n UL-DL transition periodicities after the first UL-DL transition periodicity is allocated for that RIM RS configuration set. In some embodiment, the offset is numbered by RIM RS configuration set. In one example, when the offset-config set equals 1, it indicates the second RIM RS configuration set is allocated for that RIM RS configuration set.

In some embodiment, the position of the RIM RS configuration set within the transmission periodicity is related to the identify information of the gNB or gNB set.

FIG. 4 shows an exemplary flowchart for configuring multiple sequences for RS.

At the configuring operation 402, a first sequence for a reference signal (RS) is configured in response to determining that the RS includes information indicative of a first type of status information. At the configuring operation 404, a second sequence for the RS is configured in response to determining that the RS includes information indicative of a second type of status information. The RS is transmitted in response to determining an interference and based on the configured first sequence or second sequence. The operations 402 and 404, as shown in FIG. 2 do not indicate an order of operations. Accordingly, the first and second sequence can be configured one after the other or at the same time or within some time period of each other.

In some embodiments, the first sequence is selected from a first group of sequences that is based on an identification of a base station or a set to which the base station belongs or an operations, administration, and maintenance (OAM) configuration, and the second sequence is selected from a second group of sequences that is based on a mathematical operation performed on the first sequence. In some embodiments, the first type of status information includes: an absence of atmospheric ducting phenomenon, enough interference mitigation operation, no further actions needed, or an absence of interference.

In some embodiments, the second type of status information includes: a presence of atmospheric ducting phenomenon, not enough interference mitigation operation, further actions needed, or a presence of interference. In some embodiments, the first sequence or the second sequence are configured by a base station or an operations, administration, and maintenance (OAM) entity. In some embodiments, the RS is a remote interference mitigation (RIM) RS.

FIG. 5 shows an exemplary flowchart for configuring one or more parameters for one or more sequences, a transmission interval, or one or more bandwidths for RS. At the configuring operation 502, one or more parameters are configured for one or more sequences, a transmission interval, or one or more bandwidths for a reference signal (RS), where the RS is transmitted in response to determining an interference and based on the configured one or more parameters. The one or more parameters configured at operation 502 include: (1) a time period, or (2) a first bit value associated with a transmission period for transmission of RS, or (3) a second bit value associated with a number of candidate sequences for transmission of RS, or (4) a third bit value associated with a number of candidate bandwidths for transmission of RS, or (5) an identification of a base station or a set to which the base station belongs, or (6) a first set of one or more bits from the first, second, or third bit values or from a combined bits {1, 2, . . . , the first bit value, (the first bit value+1), . . . , (the first bit value+the second bit value), (the first bit value+the second bit value+1), . . . , the third bit value}, where the first set of one or more bits are used to carry the identification of the base station or the set to which the base station belongs, or (7) a second set of one or more bits from the first, second, or third bit values or from a combined bits {1, 2, . . . , the first bit value, (the first bit value+1), . . . , (the first bit value+the second bit value), (the first bit value+the second bit value+1), . . . , the third bit value}, or from the second bit value, where the second set of one or more bits are used for transmission of different kinds of RS, or (8) a third set of one or more bits from the first, second, or third bit values or from a combined bits {1, 2, . . . , the first bit value, (the first bit value+1), . . . , (the first bit value+the second bit value), (the first bit value+the second bit value+1), . . . , the third bit value}, or from the second bit value, where the third set of one or more bits are used for carry an interference mitigation status information, or (9) multiple DL-UL switching or transmission periods, or (10) a time period for transmission of the RS in different DL-UL switching or transmission periods within a RS transmission time period.

In some embodiments, the RS is a remote interference mitigation (RIM) RS. In some embodiments, the one or more parameters described for operation 502 are configured by the base station or an operations, administration, and maintenance (OAM) entity.

Figure 6:
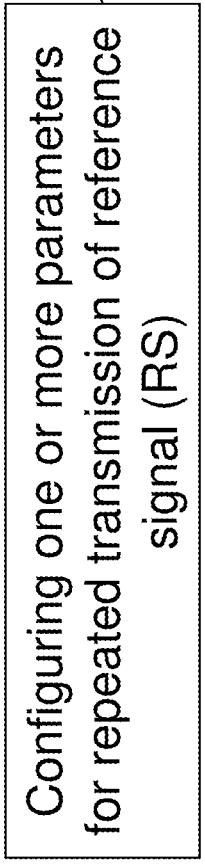
FIG. 6 shows an exemplary flowchart for configuring one or more parameters for repeated transmission of RS.

FIG. 6 shows an exemplary flowchart for configuring one or more parameters for repeated transmission of RS. At the configuring operation 602, one or more parameters are configured for repeated transmission of reference signal (RS), where the RS is repeatedly transmitted in response to determining an interference and based on the configured one or more parameters. The one or more parameters configured at operation 602 include: a number of times to transmit or re-transmit the RS, or a number of times to transmit or re-transmit the RS per switching or transmission period, or a number of time slots between two repeated transmissions of the RS, or a length of time within which the RS is transmitted or re-transmitted, or a time period or a time offset after which the RS is re-transmitted. In some embodiments, the RS is a remote interference mitigation (RIM) RS. In some embodiments, the one or more parameters are configured at operation 602 by a base station or an operations, administration, and maintenance (OAM) entity.

Figure 7:
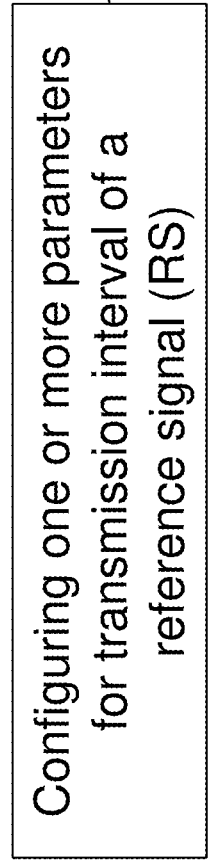
FIG. 7 shows an exemplary flowchart for configuring one or more parameters for transmission interval of RS.

FIG. 7 shows an exemplary flowchart for configuring one or more parameters for transmission interval of RS. At the configuring operation 702, one or more parameters are configured for transmission interval of a reference signal (RS), where the RS is transmitted in response to determining an interference and based on the configured one or more parameters. The one or more parameters configured at operation 702 include: multiple transmission positions or resources or configurations for RS in time domain in a downlink-uplink (DL-UL) switching or transmission period, or multiple transmission positions or resources or configurations for RS in time domain in multiple DL-UL switching or transmission periods, where each DL-UL switching or transmission period has one or more transmission positions in time domain, where different DL-UL switching or transmission periods have different transmission positions or resources or configurations, or multiple transmission positions or resources or configurations for RS in time domain in multiple RS transmission periodicities, where each RS transmission periodicity has one or more transmission positions in time domain, and where different RS transmission periodicities have different transmission positions or resources or configurations.

In some embodiments, the RS is a remote interference mitigation (RIM) RS. In some embodiments, the one or more parameters are configured at operation 702 by a base station or an operations, administration, and maintenance (OAM) entity.

Figure 8:
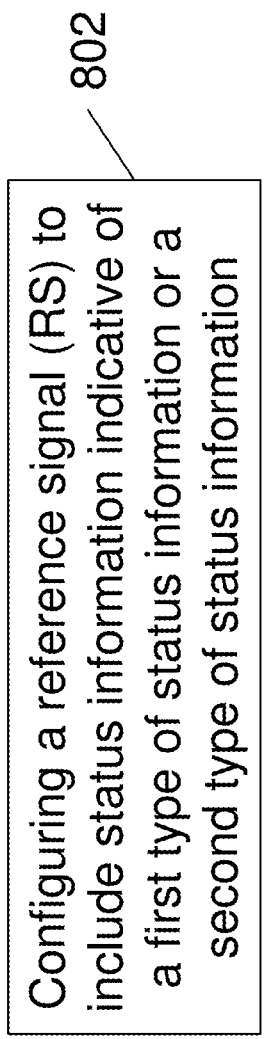
FIG. 8 shows an exemplary flowchart for configuring RS to include status information.

FIG. 8 shows an exemplary flowchart for configuring RS to include status information. At the configuring operation 802, a reference signal (RS) is configured to include status information indicative of a first type of status information or a second type of status information, where the first type of status information is transmitting in a first type of time slots or in one or more first type of downlink-uplink (DL-UL) switching periods, or where the second type of status information is transmitted in a second type of time slots or in one or more second type of DL-UL switching periods. In some embodiments, the first type of time slots are odd time slots, the first type of DL-UL switching periods are odd DL-UL switching periods, the second type of time slots are even time slots, and the second type of DL-UL switching periods are even DL-UL switching periods; or the first type of time slots are even time slots, the first type of DL-UL switching periods are even DL-UL switching periods, the second type of time slots are odd time slots, and the second type of DL-UL switching periods are odd DL-UL switching periods. In some embodiments, the RS is a remote interference mitigation (RIM) RS.

Figure 9:
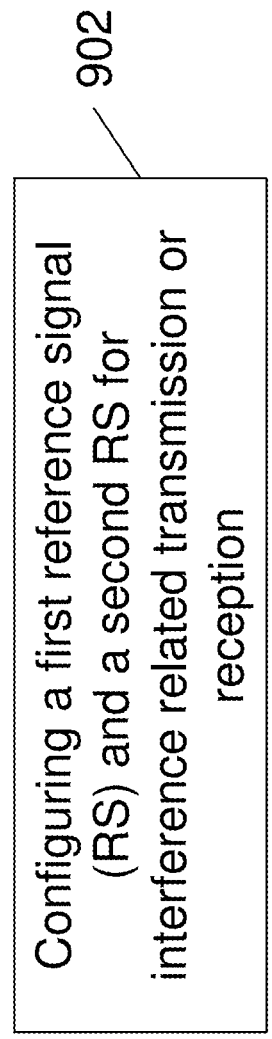
FIG. 9 shows an exemplary flowchart for configuring a first RS and a second RS for interference related transmission or reception.

FIG. 9 shows an exemplary flowchart for configuring a first RS and a second RS for interference related transmission or reception. At the configuring operation 902, a first reference signal (RS) and a second RS are configured for interference related transmission or reception, where the first RS is transmitted in first type of time slots or in one or more first type of downlink-uplink (DL-UL) switching periods, and where the second RS is received in a second type of time slots or in one or more second type of DL-UL switching periods. In some embodiments, the first type of time slots are odd time slots, the first type of DL-UL switching periods are odd DL-UL switching periods, the second type of time slots are even time slots, and the second type of DL-UL switching periods are even DL-UL switching periods; or the first type of time slots are even time slots, the first type of DL-UL switching periods are even DL-UL switching periods, the second type of time slots are odd time slots, and the second type of DL-UL switching periods are odd DL-UL switching periods. In some embodiments, the RS is a remote interference mitigation (RIM) RS. In some embodiments, the first RS or the second RS are configured by a base station or an operations, administration, and maintenance (OAM) entity.

Figure 12:
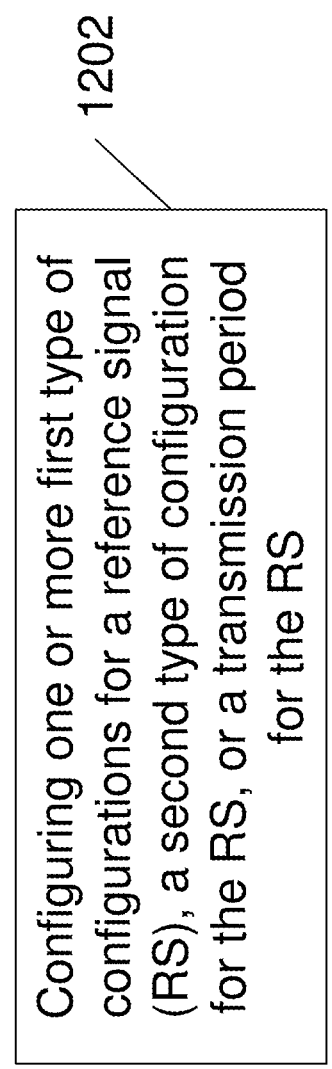
FIG. 12 shows an exemplary flowchart for configuring one or more first type of configurations, a second type of configurations or a transmission period for the RS.

FIG. 12 shows an exemplary flowchart for configuring one or more first type of configurations, a second type of configurations or a transmission period for the RS. The configuring operation 1202 is performed to configure one or more first type of configurations for a reference signal (RS), a second type of configuration for the RS, or a transmission period for the RS, where the RS is transmitted in response to determining an interference and based on the configured one or more first type of configurations, the second type of configuration or the transmission period.

In some embodiments, the one or more first type of configurations includes an offset for transmission of the RS, where the offset is in time domain or in frequency domain. In some embodiments, the one or more first type of configurations includes a reference point for transmission of the RS, where the reference point is in time domain or frequency domain. In some embodiments, the reference point in the time domain includes any one of: a cell boundary, a slot boundary where RS is transmitted, and an uplink-downlink transition period boundary where RS is transmitted.

In some embodiments, the reference point in the frequency domain includes any one of: a lowest subcarrier, a subcarrier in a common resource block, a subcarrier of a lowest-numbered resource block in a control resource set, a center resource element or resource block of synchronization signal block (SSB), or primary synchronization signal (PSS), or secondary synchronization signal (SSS), a lowest-numbered resource element or resource block of SSB or PSS or SSS, a highest-numbered resource element or resource block of SSB or PSS or SSS, a channel raster, and a synchronization raster.

In some embodiments, the second type of configuration is associated with a reference point in a frequency domain, where the reference point includes any one of: a lowest subcarrier, a subcarrier in a common resource block, a subcarrier of a lowest-numbered resource block in a control resource set, a center resource element or resource block of synchronization signal block (SSB), or primary synchronization signal (PSS), or secondary synchronization signal (SSS), a lowest-numbered resource element or resource block of SSB or PSS or SSS, a highest-numbered resource element or resource block of SSB or PSS or SSS, a channel raster, and a synchronization raster.

In some embodiments, the second type of configuration is a non-zero powered configuration for RS that indicates an absence or a presence of the RS transmission during a time period.

In some embodiments, the one or more first type of configurations is configured using a configuration set, where the one or more first type of configurations are consecutive in time domain, and where a position of the one or more first type of configurations within the configuration set is determined based on an offset value or bitmap information. In some embodiments, the offset value is based on an uplink-downlink transition period. In some embodiments, the bit-map information indicates which of the one or more first type of configurations is used for transmission of the RS.

In some embodiments, the configuration set is associated with a reference point in a frequency domain, where the reference point includes any one of: a lowest subcarrier, a subcarrier in a common resource block, a subcarrier of a lowest-numbered resource block in a control resource set, a center resource element or resource block of synchronization signal block (SSB), or primary synchronization signal (PSS), or secondary synchronization signal (SSS), a lowest-numbered resource element or resource block of SSB or PSS or SSS, a highest-numbered resource element or resource block of SSB or PSS or SSS, a channel raster, and a synchronization raster.

In some embodiments, the transmission period is a sum of a plurality of configuration sets for the RS, where time domain positions of the configuration sets within the transmission period is based on an offset value, an identification of a base station, or an identification of a set to which the base station belongs. In some embodiments, the RS is a remote interference mitigation (RIM) RS.

Figure 10:
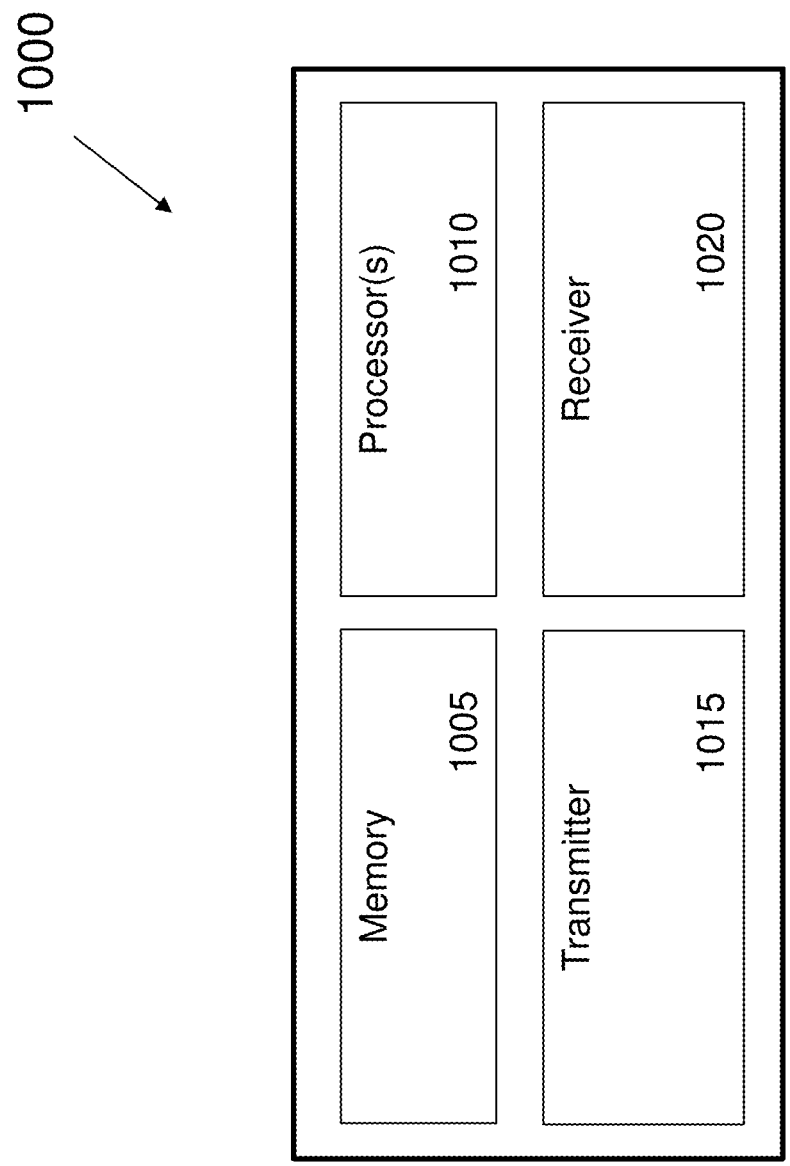
FIG. 10 shows an exemplary block diagram of a hardware platform that may be a part of a base station or a core network.

FIG. 10 shows an exemplary block diagram of a hardware platform 1000 that may be a part of a base station or a core network. The hardware platform 1000 includes at least one processor 1010 and a memory 1005 having instructions stored thereupon. The instructions upon execution by the processor 1010 configure the hardware platform 600 to perform the operations described in FIGS. 1 to 9, 11 to 12, and in the various embodiments described in this patent document. The transmitter 1015 transmits or sends information or data to another node. For example, transmitter 1015 can send a reference signal to another device. The receiver 1020 receives information or data transmitted or sent by another node. For example, the receiver 1020 receives a reference signal from another device.

IV. EXAMPLE IMPLEMENTATIONS FOR 3GPP STANDARDS

The following description describes example implementations that may be part of the 3GPP standard.

A. OAM Functions

Base on RIM frameworks described in TR 38.866-g00, a list several OAM functions that may be required for RIM operation are summarized below, some may or may not have specification impact:

a. Configuring Set IDs and/or Associated RIM RS Resources

The grouping of gNBs into sets, the set ID, the RIM-RS configuration and the associated RIM RS radio resources for sending and/or receiving the RIM RS are performed by the OAM system, and these resources may be assigned in static or a non-static manner.

b. Configuring the gNB(s) to Start Monitoring RIM RS

E.g. in Framework-0 or in Framework-1/2.1/2.2 with asymmetric IoT increase (i.e. scenario #2), the aggressor starts monitoring RIM RS (RS-1) as configured by the OAM.

c. Receiving the Detected RIM RS, the Measured RI, or the Number of Interfered Resources from the gNB(s)

E.g. in Framework-0, Once RIM RS is detected, the aggressor reports the detected RIM RS (as well as the detected gNB set ID carried by the RS, if it has this ability) to the OAM and waits for the configured RIM mitigation from the OAM. For Framework-1, 2.1 and 2.2, when atmospheric duct interference is detected by the victim, the victim reports the remote interference to OAM, then OAM indicates the potential aggressor gNBs to start the RIM RS monitoring.

d. Configuring RIM Mitigation Scheme to the gNB(s)

E.g. in Framework-0 or other frameworks, the OAM can pre-configure the non-overlapped frequency-domain resources used for DL and UL to gNBs for the situation when remote interference is present, if frequency-domain based solutions are adopted. Noted that almost all interference schemes (including time/frequency/spatial/power-domain based) provided in TR 38.866-g00 have no spec impact. Accordingly, this OAM function can be achieved by implementation.

e. Configuring the gNB(s) to Stop RS Monitoring and Restore Original Configuration E.g. in Framework-0, OAM stops RIM RS monitoring and restores original configuration at aggressor side and stop RS transmission at victim side.

Only OAM functions (except gNB sets grouping in it) among above five functions has specification impacts. Accordingly, the identity or identities of the OAM messages or signalings can be decided for RIM operation.

Feature 1: Identify exactly which OAM signalings need to be introduced to support configuring set IDs and/or associated RIM RS resources as one of OAM functions.

B. OAM Configurations

RIM RS-1 (exists in all frameworks, but in Framework-0/2.1/2.2 named as RS) is transmitted by the victim to the aggressor for the following functions:
1. Being able to provide information whether the atmospheric ducting phenomenon exists
2. Being able to assist the interfering gNB to identify how many UL OFDM symbols at the interfered gNB it impacted.
3. Being able to carry enough information to enable the information exchange through backhaul (e.g. gNB set ID).
4. Carrying further information, such as one or more of the following information "Ducting phenomenon does not exist" & "Ducting phenomenon exists". "Enough mitigation" & "Not enough mitigation", "Interference does not exist" & "Interference still exists".

RIM RS-2 (in Framework-1) is transmitted by the aggressor to the victim for the following functions:
1. Being able to provide information whether the atmospheric ducting phenomenon exists In addition to configuring basic resources for RIM RS transmission, the configurations of OAM also need to support the following requirements based on above functions of RIM RS1 or RIM RS2.

a. Requirements for OAM

Requirement 1: Distinguishable RIM reference signals (RS-1 and RS-2)

In some frameworks e.g. Framework-2.1 and 2.2, RIM RS-2 may not be transmitted by the aggressor gNB to the victim gNB since there is a backhaul link between them for exchange information. However, if RS-2 is configured, RS-1 and RS-2 should be distinguishable and are separately configured, due to RS-1 and RS-2 have different functions. They are also transmitted by the gNBs playing different roles. Thus, the configuration(s) performed by OAM to the gNBs should be supported to distinguish RIM RS-1 and RS-2.

In Framework-2.1/2.2, RIM RS-1 should be able to carry the gNB or the gNB set identification to enable the information exchange through backhaul. In Framework-0/1, although RS-1 does not need to provide ID information for the following backhaul communication, it can promote remote interference mitigation if it also carries ID information. Thus, the RIM RS-1 irrespective of framework chosen should convey ID information, while RIM RS-2 can or can not carry ID information. Besides, considering the long distance between the victim gNB and the aggressor gNB in RIM scenario, enough distinguishable candidate RIM RS resources are needed for carrying enormous set ID information.

Requirement 2: Multiple RIM RS resources (or configurations) for RS detection of the gNBs with different distances In general, the gNB is not expected to receive RS before the DL transmission boundary (defined in 3GPP TS 38.866-g00), and not expected to transmit RS after the UL reception boundary (defined in 3GPP TS 38.866-16.0.0). In other words, the gNB is not expected to receive RS at least in DL slot or DL symbols, and not expected to transmit RS at least in UL slot or UL symbols.

Due to the larger subcarrier spacing permitted in NR e.g. 30 kHz, if the first gNB transmits RIM RS (RS-1 or RS-2) on the symbol(s) immediately before the DL transmission boundary, the second gNB may not detect RIM RS on flexible symbols or UL symbols, because RIM RS may drop in the DL slots or symbols in next DL-UL switching period at the second gNB side. This case usually occurs when two gNBs are far away from each other. Conversely, when the two gNBs are relatively close, the second gNB will also not detect RIM RS on non-DL symbols if the first gNB transmit RIM RS on the symbols relatively far before the DL transmission boundary.

To avoid the above problems, a gNB can be configured with multiple RIM RS resources (or configurations) in a configured RIM RS periodicity or in a DL-UL switching period. That means in a configured RIM RS periodicity or in a DL-UL switching period, the gNB can transmission multiple RIM RSs on different resources/configurations, i.e. on different symbol(s). These RIM RS resources/configurations/symbols can be continuous or discontinuous in time domain. Or a gNB can be configured with longer length RIM RS to avoid the above problems. In normal case, a RIM RS consists of two symbols with two concatenated copies of the RS sequence, but can also be configured with more than two symbols with more than two concatenated copies of the RS sequence.

Therefore, OAM and/or the gNB can be configured to support configuration of multiple RIM RS resources (or configurations) for successful RS detection of the gNBs with different distances.

Requirement 3: Repetition transmission of RIM RS (RS-1 or RS-2)

In order to improve the detection performance of RIM RS (both RS-1 and RS-2), the configurations for repetition transmission of RIM RS in time or frequency domain can be considered. As system bandwidths available for the gNBs located in different regions or belong to different operators are different, repetition transmission in frequency domain may not achieve the desired performance gains. Thus, repetition scheme in time-domain can be preferred.

Requirement 4: Convey the interference mitigation status information

The victim gNB needs to convey the interference mitigation status information to the aggressor gNB, such as one or more of the following information "Ducting phenomenon does not exist" or "Ducting phenomenon exists". "Enough mitigation" or "Not enough mitigation", or "Interference does not exist" or "Interference still exists", etc. One or more configurations to convey above information can be supported.

Feature 2: OAM configuration can support the following requirements for RIM operation:

Requirement 1: Distinguishable RIM reference signals (RS-1 and RS-2)

Requirement 2: Multiple RIM RS resources (or configurations) for RS detection of the gNBs with different distances Requirement 3: Repetition transmission of RIM RS Requirement 4: Convey the interference mitigation status information b. Distinguishable RIM RS Resources At first, several concepts need to be clarified: DL-UL switching period, RIM RS transmission periodicity, and basic time period.

One DL-UL switching period (e.g. configured by tdd-UL-DL-ConfigurationCommon and/or tdd-UL-DL-ConfigurationCommon2 defined in 3GPP TS 38.213-f30) usually includes three parts in turn: DL slot(s), flexible part (DL symbols, flexible symbols, UL symbols), UL slot(s). A DL-UL switching period is equivalent to the periodicity of the TDD DL/UL pattern.

The RIM RS transmission periodicity can be a multiple of the periodicity of the TDD DL/UL pattern (i.e. DL-UL switching period), or a multiple of the combined periodicity, if two TDD DL/UL patterns (e.g. configured by tdd-UL-DL-ConfigurationCommon and tdd-UL-DL-Configuration-Common2) are configured.

In order to satisfy above different requirements, OAM or the gNB configure different basic time periods (TDM) different sequences (CDM), and/or different bandwidths (FDM) to transmit RIM RS.

Figure 11:
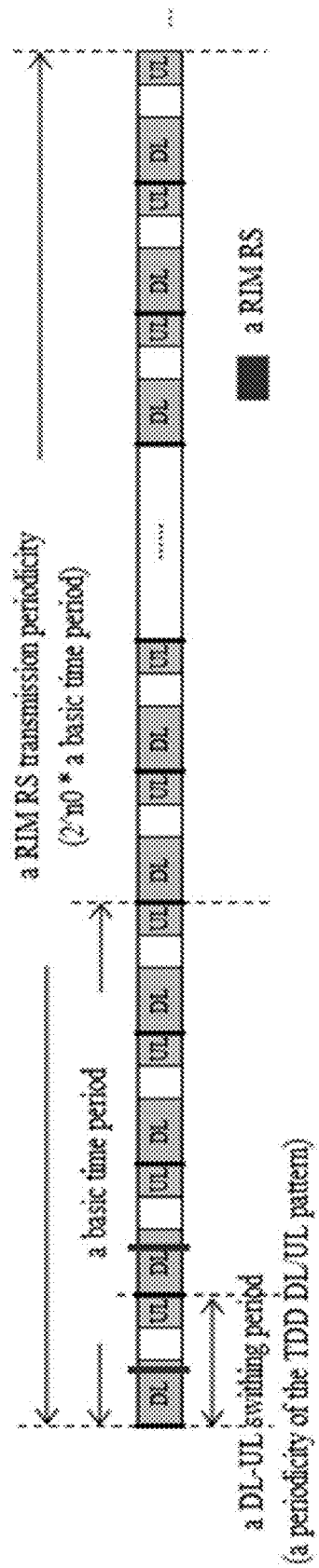
FIG. 11 shows different kinds of periods in RIM.

TDM: OAM configures one or multiple of a DL-UL switching period or a combined periodicity if two TDD DL/UL patterns are configured, or a fixed time period (e.g. 5 ms or 10 ms) as a basic time period. Basic time period is a granularity in time domain to carry ID information, that is to say, all RIM RSs sent in a basic time period carry same ID information if these RSs use same sequence and same bandwidth. Three kinds of periods are shown in FIG. 11.

In general, a basic time period is more than or equal to a DL-UL switching period or a combined periodicity. In other words, a basic time period can be a multiple of a DL-UL switching period or a combined periodicity.

a RIM RS transmission periodicity=$2^{n0}$*a basic time period;

TDM method can provide up to $2^{n0}$ distinguishable RIM RS resources.

CDM: OAM configures $2^{n1}$ candidates sequences for RIM RS transmission.

CDM method can provide up to $2^{n1}$ distinguishable RIM RS resources.

FDM: OAM configures $2^{n3}$ candidate bandwidths (e.g. each with 20 MHz) for RIM RS transmission.

FDM method can provide up to $2^{n2}$ distinguishable RIM RS resources.

Where n0, n1 and/or n2 can be configured by OAM, which means the size of distinguishable RIM RS resources can be configured. Furthermore, it should be noted that not all bits of n0+n1+n2 need to be used for carrying ID information. Table 1 gives an example for how to generate distinguishable RIM RS resources.

TABLE 1

The number of distinguishable RIM RS resources

| | TDM a basic time period (e.g. 10 ms) | CDM sequence | FDM System bandwidth (MHz), e.g. 80 MHz | Total number | a RIM RS transmission periodicity |
|---|---|---|---|---|---|
| Multiplexing resource size the number of bits | $2^{16}$ ($2^{n0}$) n0 = 16 | 8 ($2^{n1}$) n1 = 3 | 1($2^{0}$) n2 = 0 (Disable FDM method) | $2^{19}$ = 524288 n0 + n1 + n2 = 19 | $2^{16}$*10 ms = 655.36 seconds |

C. OAM Configurations

In order to satisfy above different requirements and functionalities, OAM configures the gNB and/or the gNB configures itself in terms of sequence type, time and frequency transmission resources or pattern.

Basic resource configuration (named as Resource i):

1. A basic time period (one or multiple of a periodicity of TDD DL/UL pattern or the combined periodicity of two TDD DL/UL patterns).
2. n0 and/or the value of n0 bits. n0 indicates a RIM RS transmission periodicity. Values of n0 bits indicates RIM RS is transmitted in which basic time period in a RIM RS transmission periodicity. For example, n0=10, indicates a RIM RS transmission periodicity=$2^{10}$*a basic time period. The value of n0 bits=0000000101, indicates RIM RS is transmitted in 5th basic time period in a RIM RS transmission periodicity.
3. n1 and/or the value of n1 bits. n1 indicates the number of RIM RS candidate sequences. Values of n1 bits indicates RIM RS is transmitted based on which sequence. Adding a new parameter x in the initialization of pseudo-random sequence generator cinit (like CSI-RS sequence generation). For the reception gNB, all candidate sequences are generated based on x, e.g. x={0, 1, 2, . . . , $2^{n1}$−1}, or x={x_0, x_1, x_2, . . . , x_($2^{n1}$−1)} configured by OAM. For the transmission gNB, the chosen sequence are generated based on x (a single value, not a set), which is decided by values of n0 bits, set ID or OAM configuration. Initialization phases also need to include the factor to reflect DL-UL switching period changes, but do not need to include the factor of symbol/slot number so as to insure the number of sequences generated/detected in one DL-UL period for interference identification is less than 8. For example, n1=3, indicates the number of RIM RS candidate sequences=$2^{3}$=8. The value of n1 bits=011, indicates RIM RS is transmitted using 3th sequence among 8 candidate sequences.
4. n2 and/or the valued of n2 bits. n2 indicates the number of RIM RS candidate bandwidths. Value of n2 bits indicates RIM RS is transmitted on which candidate bandwidth. If n2−0, RIM RS can be transmitted in whole system bandwidth of the gNB, or in the configured bandwidth by OAM. In order to solve the problem of in-alignment bandwidth usage of the gNBs located in different regions or belong to different operators, a common reference point needs to be configured. For example, n2=2, indicates the number of RIM RS candidate bandwidths=$2^{2}$=4. The value of n2 bits=11, indicates RIM RS is transmitted based on 3th bandwidth in 4 candidate widths.
5. gNB set ID, or the mapping rule between set ID and {bit (1, 2, ..., n0, n0+1, ..., n0+n1, n0+n1+1, ..., n0+n1+n2)}, or above bit string already carries set ID information. If RIM RS does not need to carry set ID information, this parameter can not be configured.
6. One or more DL-UL switching period carrying RIM-RS in a basic time period or in a RIM RS transmission periodicity. If a DL-UL switching period has a configured RIM RS resource, it can be called a time occasion for RIM RS.
7. The position of DL (1st) transmission boundary and UL (2nd) transmission boundary within a DL-UL switching period.
8. RIM RS transmission time position in a DL-UL switching period, which can be obtained by configuring a symbol offset to 1st/2nd transmission boundary or other ways (e.g. bitmap).
9. Reference point in time domain or in frequency domain. Reference point is used for configuring or detecting RIM RS.

To support different requirements in section IV.B.a:

For Requirement 1 distinguishable RIM reference signals, OAM entity can configure two resource configurations for RIM RS-1 and RS-2 respectively (e.g. Resource a1 for RS-1 and Resource a2 for RS-2). Resource a1 and Resource a2 can be configured with different time occasions or RS sequences to distinguish RS-1 and RS-2. OAM can configure two sets of time occasions or DL-UL switching periods for RS transmission, in which the first set of time occasions or DL-UL switching periods for RS-1 transmission (e.g., one or more odd occasions or periods), the second set of time occasions or DL-UL switching periods for RS-2 transmission (e.g., one or more even occasions or periods).

For Requirement 2 RS detection of the gNBs with different distances, OAM can configure one or more resource configurations (e.g. Resource b1 and Resource b2) or using multiple sets of time occasions or DL-UL switching periods, e.g., two sets of occasions or periods. In first set of time occasions or DL-UL switching periods (e.g. one or more odd occasions/periods), RIM-RS is configured in the first time position in the occasion/period. In second set of time occasions or DL-UL switching periods (e.g. one or more even occasions/periods), RIM-RS is configured in the second time position in the occasion/period. The RS positions in time occasions or switching periods in different sets should be different in order to ensure that RIM RS can be detected by both near and far interfering/interfered gNBs. The near/far interfering gNBs can also identify how many UL OFDM symbols at the interfered gNB it impacted based on time position and set type for RIM RS transmission.

For Requirement 3 repetition transmission, OAM can configure multiple DL-UL switching periods in one resource e.g. Resource c for RIM RS repetition transmission. OAM can also configure multiple resources (e.g. Resource c1, c2, ..., cn), each resource has one or more time occasions. Or, OAM configure repetition parameter, e.g. offset, repetition times, repetition spacing, repetition period, repetition duration/pattern, etc., Or, OAM can configure a repetition transmission indicator, that indicate whether a resource or configuration configured by OAM is a repetition transmission or not.

For Requirement 4 conveying the interference mitigation status information, "Enough mitigation" and "Not enough mitigation" can be carried via two separate resource configurations (e.g. Resource d1 and Resource d2) using two sets of time occasions or DL-UL switching periods. If "Enough mitigation" needs to be informed, the RIM RS is transmitted in the first set of time occasions or DL-UL switching periods, e.g. one or more odd occasions/periods. If "Not enough mitigation" needs to be informed, the RIM RS is transmitted in the second set of time occasions or DL-UL switching periods, e.g. one or more even occasions/periods.

Note that above configuration methods for four requirements can be combined. In other word, one or more resources (N resources, N>=1) can be configured to satisfy several requirements at the same time. OAM can configure one or more resources to meet only one or more requirements, that ensures the flexibility of implementation.

D. Conclusion

In Section IV. OAM functions and OAM configurations for RIM operation were discussed, and describe the following features:

Features 1: Identify which OAM signalings need to be introduced to support configuring set IDs and/or (associated) RIM RS resources as one of OAM functions.

Feature 2: OAM configuration can support the following requirements for RIM operation:
Requirement 1: Distinguishable RIM reference signals (RS-1 and RS-2)
Requirement 2: Multiple RIM RS resources (or configurations) for RS detection of the gNBs with different distances
Requirement 3: Repetition transmission of RIM RS
Requirement 4: Convey the interference mitigation status information In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
    configuring a first sequence for a reference signal (RS) in response to determining that the RS includes information indicative of a first type of status information,
        wherein the first type of status information indicates that enough interference mitigation operation is performed;
    configuring a second sequence for the RS in response to determining that the RS includes information indicative of a second type of status information,
        wherein the second type of status information indicates that not enough interference mitigation operation is performed;
    configuring for the RS the following repetition related information:
        a number of times the RS is repeatedly transmitted,
        wherein the number of times the RS is repeatedly transmitted is equal to a number of downlink-uplink (DL-UL) switching periods; and
    transmitting the RS based on the configured first sequence or second sequence and based on the repetition related information.

2. The method of claim 1, wherein the first type of status information indicates no further actions needed.

3. The method of claim 1, wherein the second type of status information indicates further actions needed.

4. The method of claim 1, wherein the first sequence or the second sequence are configured by a base station.

5. The method of claim 1, wherein the RS is a remote interference mitigation (RIM) RS.

6. An apparatus for wireless communication comprising a processor, configured to implement a method, comprising:
    configure a first sequence for a reference signal (RS) in response to determining that the RS includes information indicative of a first type of status information,
        wherein the first type of status information indicates that enough interference mitigation operation is performed;
    configure a second sequence for the RS in response to determining that the RS includes information indicative of a second type of status information,
        wherein the second type of status information indicates that not enough interference mitigation operation is performed;
    configure for the RS the following repetition related information:
        a number of times the RS is repeatedly transmitted,
        wherein the number of times the RS is repeatedly transmitted is equal to a number of downlink-uplink (DL-UL) switching periods; and
    transmit the RS based on the configured first sequence or second sequence and based on the repetition related information.

7. The apparatus of claim 6, wherein the first type of status information indicates no further actions needed.

8. The apparatus of claim 6, wherein the second type of status information indicates further actions needed.

9. The apparatus of claim 6, wherein the first sequence or the second sequence are configured by a base station.

10. The apparatus of claim 6, wherein the RS is a remote interference mitigation (RIM) RS.

11. A non-transitory computer readable program storage medium having code stored thereon, the code, when executed by a processor, causing the processor to implement a method, comprising:
    configuring a first sequence for a reference signal (RS) in response to determining that the RS includes information indicative of a first type of status information,
        wherein the first type of status information indicates that enough interference mitigation operation is performed;
    configuring a second sequence for the RS in response to determining that the RS includes information indicative of a second type of status information,
        wherein the second type of status information indicates that not enough interference mitigation operation is performed;
    configuring for the RS the following repetition related information:
        a number of times the RS is repeatedly transmitted,
        wherein the number of times the RS is repeatedly transmitted is equal to a number of downlink-uplink (DL-UL) switching periods; and
    transmitting the RS based on the configured first sequence or second sequence and based on the repetition related information.

12. The non-transitory computer readable program storage medium of claim 11, wherein the first type of status information indicates no further actions needed.

13. The non-transitory computer readable program storage medium of claim 11, wherein the second type of status information indicates further actions needed.

14. The non-transitory computer readable program storage medium of claim 11, wherein the first sequence or the second sequence are configured by a base station.

15. The non-transitory computer readable program storage medium of claim 11, wherein the RS is a remote interference mitigation (RIM) RS.

\* \* \* \* \*

UNITED STATES PATENT AND TRADEMARK OFFICE
CERTIFICATE OF CORRECTION

PATENT NO.         : 12,004,209 B2
APPLICATION NO.    : 17/232044
DATED              : June 4, 2024
INVENTOR(S)        : Hanqing Xu et al.

It is certified that error appears in the above-identified patent and that said Letters Patent is hereby corrected as shown below:

On the Title Page

On Page 2, Item (56), under "OTHER PUBLICATIONS", in Column 2, Line 20, delete "Tisense," and insert --Hisense,--
On Page 2, Item (56), under "OTHER PUBLICATIONS", in Column 2, Line 21, delete "ChengDu," and insert --Chengdu,--
On Page 2, Item (56), under "OTHER PUBLICATIONS", in Column 2, Line 35, delete "Chungdu," and insert --Chengdu,--

In the Drawings

In Fig. 11, Sheet 11 of 12, delete "swithing" and insert --switching--

In the Specification

In Column 5, Line 33, delete "example" and insert --example of--
In Column 6, Line 28, delete "transmission." and insert --of transmission--
In Column 6, Line 62, delete "Framework-2.1." and insert --Framework-2.1,--
In Column 9, Line 12, delete "the" and insert --for the--
In Column 11, Line 7, delete "sequence;" and insert --sequence.--
In Column 12, Lines 29-30, delete "$TDM\ a\ basic\ time$" and insert --$TDM\ a\ basic\ time$--
In Column 12, Line 47, delete "no" and insert --n0--
In Column 12, Line 49, delete "indicates" and insert --indicate--
In Column 12, Line 53, delete "indicates" and insert --indicate--
In Column 12, Line 58, delete "indicates" and insert --indicate--
In Column 13, Line 66, delete "first one" and insert --first--
In Column 16, Line 45, delete "identify" and insert --identity--
In Column 20, Line 45, delete "Base" and insert --Based--

Signed and Sealed this
Thirtieth Day of July, 2024

Katherine Kelly Vidal
*Director of the United States Patent and Trademark Office*

CERTIFICATE OF CORRECTION (continued)
U.S. Pat. No. 12,004,209 B2

In Column 20, Line 46, delete "list" and insert --list of--
In Column 21, Line 11, delete "Noted" and insert --Note--
In Column 21, Line 44, delete "exists"." and insert --exists",--
In Column 22, Line 40, delete "transmission" and insert --transmit--
In Column 23, Line 2, delete "exists"." and insert --exists",--
In Column 24, Line 50, delete "insure" and insert --ensure--
In Column 24, Line 60, delete "n2-0," and insert --n2=0,--
In Column 26, Line 18, delete "Section IV." and insert --Section IV,--